US012374826B1

(12) United States Patent
Kirby et al.

(10) Patent No.: US 12,374,826 B1
(45) Date of Patent: Jul. 29, 2025

(54) SELECTIVELY ATTACHING AND DETACHING A SENSOR TO A GLOVE

(71) Applicant: OMMO Technologies, Inc., Carrollton, TX (US)

(72) Inventors: Jonah William Kirby, Carrollton, TX (US); Om Anand Binodkumar Sharma, Irving, TX (US); Minjie Zheng, Plano, TX (US)

(73) Assignee: OMMO Technologies, Inc., Carrollton, TX (US)

( * ) Notice: Subject to any disclaimer, the term of this patent is extended or adjusted under 35 U.S.C. 154(b) by 595 days.

(21) Appl. No.: 17/737,540

(22) Filed: May 5, 2022

(51) Int. Cl.
| | |
|---|---|
| *H01R 13/00* | (2006.01) |
| *A41D 19/00* | (2006.01) |
| *F16B 2/06* | (2006.01) |
| *G01D 11/30* | (2006.01) |
| *H01R 13/627* | (2006.01) |
| *G06F 1/16* | (2006.01) |

(52) U.S. Cl.
CPC ..... *H01R 13/6271* (2013.01); *A41D 19/0024* (2013.01); *F16B 2/06* (2013.01); *G01D 11/30* (2013.01); *G06F 1/16* (2013.01)

(58) Field of Classification Search
CPC ... H01R 13/6271; A41D 19/0024; F16B 2/06; G06F 1/16
See application file for complete search history.

(56) References Cited

U.S. PATENT DOCUMENTS

| | | | |
|---|---|---|---|
| 7,415,891 B2 | 8/2008 | Santos et al. | |
| 8,276,215 B2 | 10/2012 | Merkle et al. | |
| 9,014,778 B2 | 4/2015 | Datta et al. | |
| 9,189,022 B2 | 11/2015 | Burgess | |
| 9,277,867 B2 | 3/2016 | Kurzweil et al. | |
| 9,848,803 B2 | 12/2017 | Schaffer | |
| 9,971,404 B2 | 5/2018 | Messingher et al. | |
| 10,541,487 B2 * | 1/2020 | Wu ................... | H01R 12/7076 |
| 2013/0169420 A1 | 7/2013 | Blount | |
| 2015/0035743 A1 | 2/2015 | Rosener | |
| 2016/0161301 A1 | 6/2016 | Guenther et al. | |
| 2017/0086519 A1 | 3/2017 | Vigano' et al. | |
| 2020/0113258 A1 | 4/2020 | Guenther et al. | |

* cited by examiner

*Primary Examiner* — Phuong Chi Thi Nguyen
(74) *Attorney, Agent, or Firm* — Henry Patent Law Firm PLLC

(57) ABSTRACT

In a general aspect, a sensor assembly for selectively attaching and detaching a sensor to an article includes a base and a sensor housing. The base is on the article and is configured to selectively seat and unseat the sensor housing. The sensor housing includes a cavity configured to contain the sensor. The sensor housing also includes an opening configured to receive the sensor into the cavity. The base and the sensor housing include respective pivot surfaces that, when mated, define a pivot joint configured to pivot the sensor housing relative to the base during seating and unseating. The base and the sensor housing also include respective latching surfaces configured to selectively secure and unsecure the sensor housing to the base. In some variations, the article is a glove, and the sensor may be configured to generate sensor signals in response to motion of the glove.

24 Claims, 18 Drawing Sheets

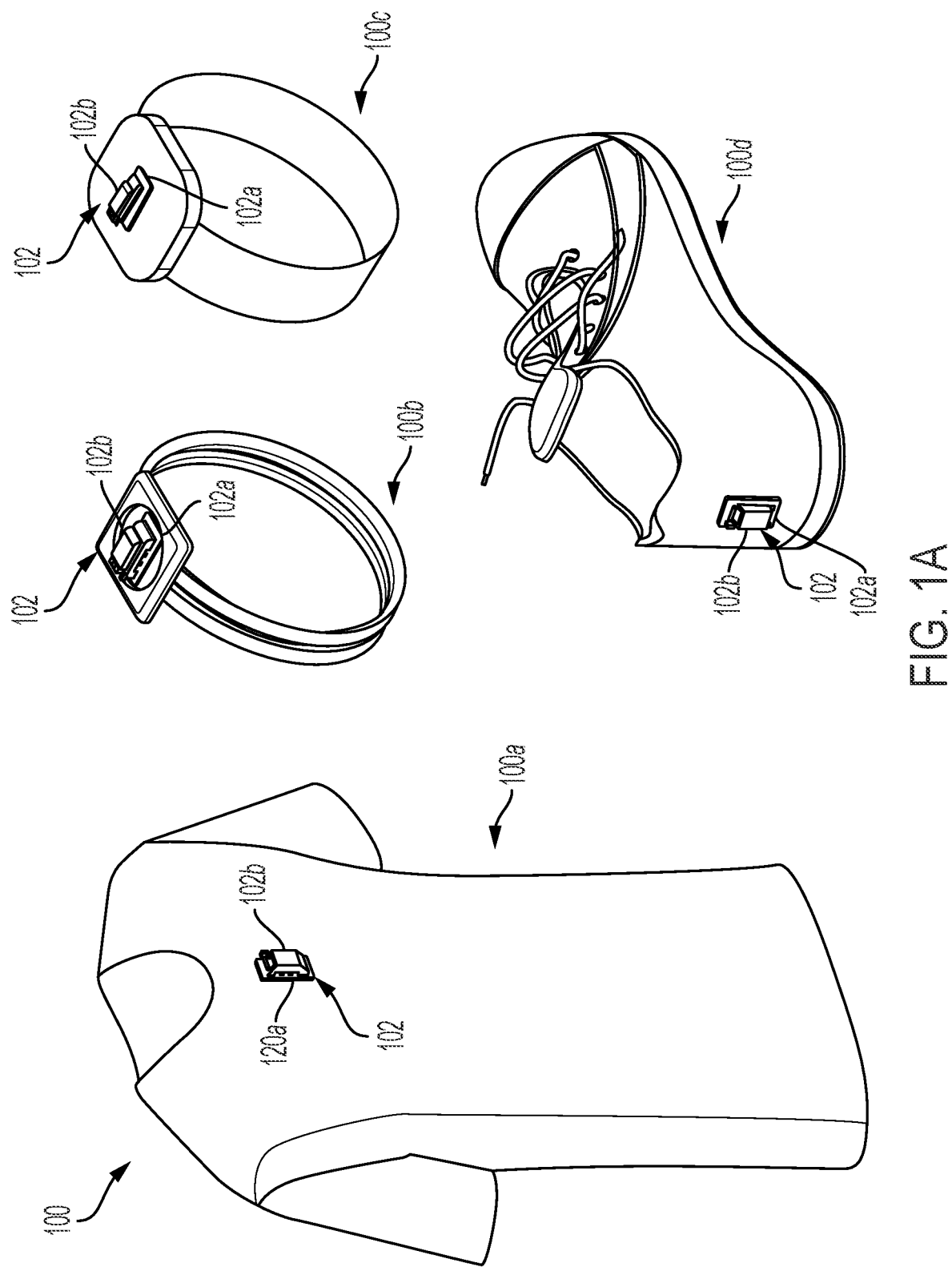

SELECTIVELY ATTACHING AND DETACHING A SENSOR TO A GLOVE

BACKGROUND

The following description relates to selectively attaching and detaching a sensor to a glove.

Various types of systems use sensors to measure physical properties in an environment. For example, a chemical system may incorporate a temperature sensor to measure a temperature of a chemical compound (e.g., a solvent) in a reaction vessel, thereby controlling a reaction in which the chemical compound participates. A mechanical system may incorporate a proximity sensor to measure the distance between a moving component of the mechanical system and a reference point. The physical properties measured by a sensor may be associated with a target location in the environment. As such, the sensor may need to be positioned at or near the target location.

DESCRIPTION OF DRAWINGS

FIG. 1A is a schematic diagram of example wearable articles having respective exteriors on which a sensor assembly resides;

FIG. 2A-1 is a schematic diagram, in detail view, of a cantilever portion of the example base of FIG. 2A;

FIG. 2B-1 is a schematic diagram, in cross-section, of a portion of the example base and a portion of the example sensor housing shown in FIG. 2B;

DETAILED DESCRIPTION

Figure 1B:
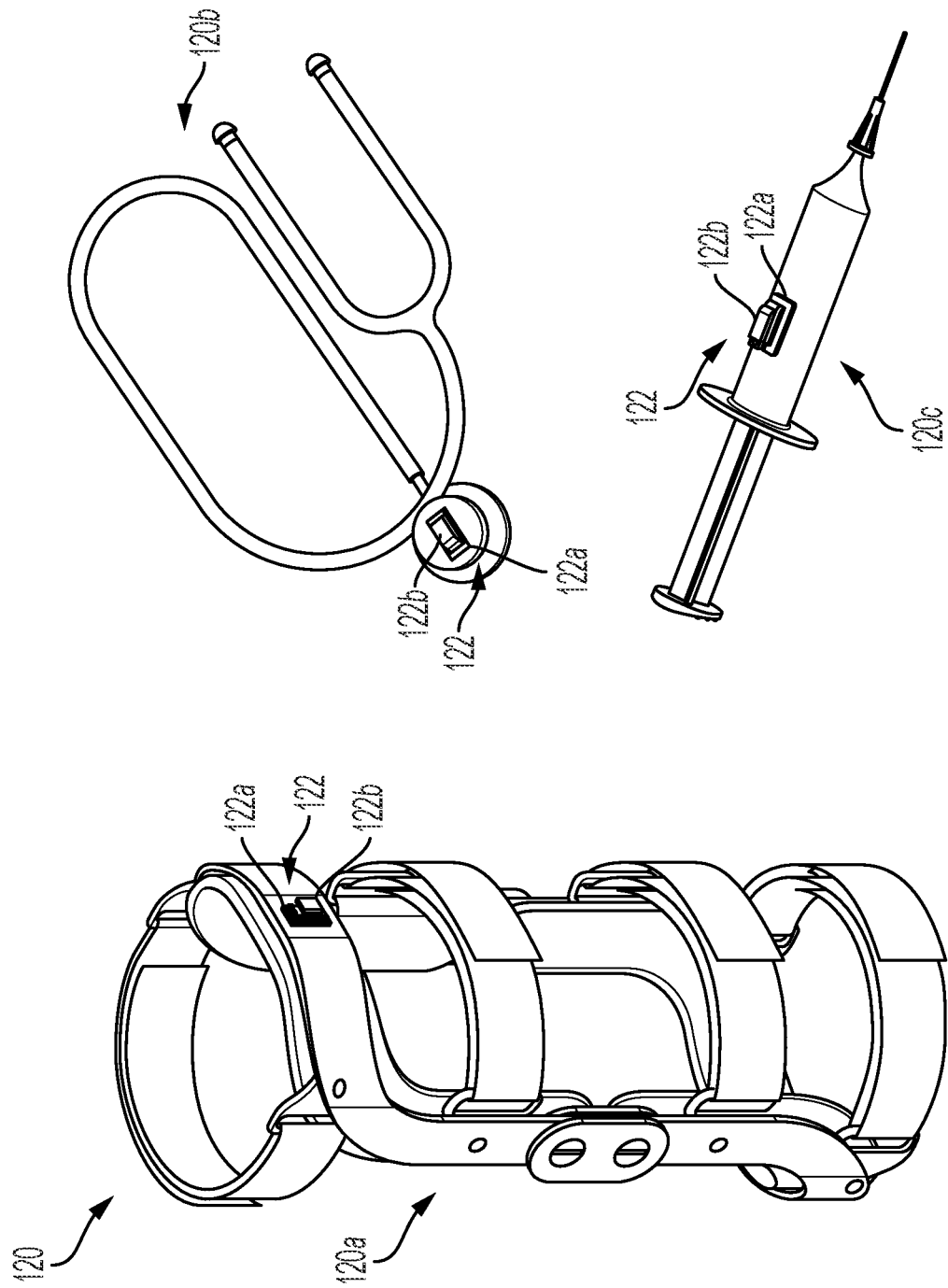
FIG. 1B is a schematic diagram of example medical devices and surgical instruments having respective exteriors on which a sensor assembly resides.

In a general aspect, a sensor assembly for selectively attaching and detaching a sensor to an article may include a base and a sensor housing. The base may be on the article (e.g., on an exterior of the article, on an interior of the article, etc.) and may be configured to selectively seat and unseat the sensor housing. In some instances, the base is coupled to the article. For example, the base may be coupled to a surface of the article (e.g., an exterior surface of the article). In some instances, the base is an integral part of the article. The sensor housing may include a cavity configured to contain a sensor and an opening configured to receive the sensor and the housing. The sensor may be part of a sensor electronics package, and in such instances, the cavity may be configured to contain the sensor electronics package. Examples of the sensor include a position sensor, a motion sensor, a proximity sensor, a contact sensor, a temperature sensor, a pressure sensor, a magnetic field sensor, and an electric field sensor. Combinations of sensors are possible. In some variations, the sensor assembly includes the sensor, which may be disposed in the cavity of the sensor housing.

To facilitate seating and unseating of the sensor housing to the base, the base and sensor housing may include respective pivot surfaces that, when mated, define a pivot joint configured to pivot the sensor housing relative to the base during seating and unseating. The base and the sensor housing may also include respective latching surfaces configured to selectively secure and unsecure the sensor housing to the base. In operation, the pivot and latching surfaces of the base may apply forces to, respectively, the pivot and latching surfaces of the sensor housing to secure the sensor housing to the base. In some variations, the pivot and latching surfaces of the base are at opposite ends of the base and the pivot and latching surfaces of the sensor housing are at opposite ends of the sensor housing.

In some implementations, the article that includes the sensor assembly can be readily moved in response to human, machine, or animal action (e.g., a fabric article). Such action may include being carried, worn, pushed, pulled, rotated, and so forth. In some examples, the article (e.g., a garment or accessory) is made of a conforming material (e.g., a web, fabric, mesh, etc.) that can bend, stretch, or otherwise alter in shape during use. In other examples, the article may be made of a non-conforming material (e.g., a medical device). The base may reside at a specified location on the article, so that various sensors can be attached to the base to measure the specified location during use; the sensors can then be detached from the base and used with different articles. In some cases, certain types of articles (e.g., a medical glove or other medical garment) can be disposed of after one or more uses, and the sensors can then be reused with other articles. As such, the sensor assembly can enable a system platform in which multiple sensors or sensor types can be interchanged in the same location on an article, and a sensor can be reused with multiple different articles and article types.

In some variations, the article is an item or object worn by a person (e.g., clothing, shoes, jewelry, etc.). FIG. 1A presents a schematic diagram of example wearable articles 100 having respective exteriors on which a sensor assembly 102 resides (e.g., is attached). In FIG. 1A, the wearable articles 100 are illustrated as a shirt 100a, a bracelet 100b, a watch 100c, and a shoe 100d. However, other types of wearable articles are possible. Each sensor assembly 102 includes a base 102a coupled to an exterior surface of the wearable article 100, with the sensor housing 102b being seated in, and secured to, the base 102a. However, the base 102a can, in some variations, also be an integral part of the wearable article 100. Although FIG. 1A illustrates the sensor assembly 102 on the exteriors of the wearable articles 100, the sensor assembly can be on an interior of the wearable articles 100 (e.g., an interior surface of the wearable articles 100).

In some variations, the article is a device or instrument that can be manipulated by the hands (or other body part). FIG. 1B presents a schematic diagram of example medical devices and surgical instruments 120 having respective exteriors on which a sensor assembly 122 resides (e.g., is attached). In FIG. 1B, the medical devices and surgical instruments 102 are illustrated as a leg brace 120a, a stethoscope 120b, and a syringe 102c. However, other types of medical devices and surgical instruments are possible. Each sensor assembly 122 includes a base 122a coupled to an external surface of the medical device or surgical instrument 120, with the sensor housing 122b being seated in, and secured to, the base 122a. However, similar to the wearable articles 100 of FIG. 1A, the bases 102a of FIG. 1B can also be an integral part of the medical device or surgical instrument 120. In some variations, the bases 102a are on an interior of the medical devices and surgical instruments 120.

Figure 1C:
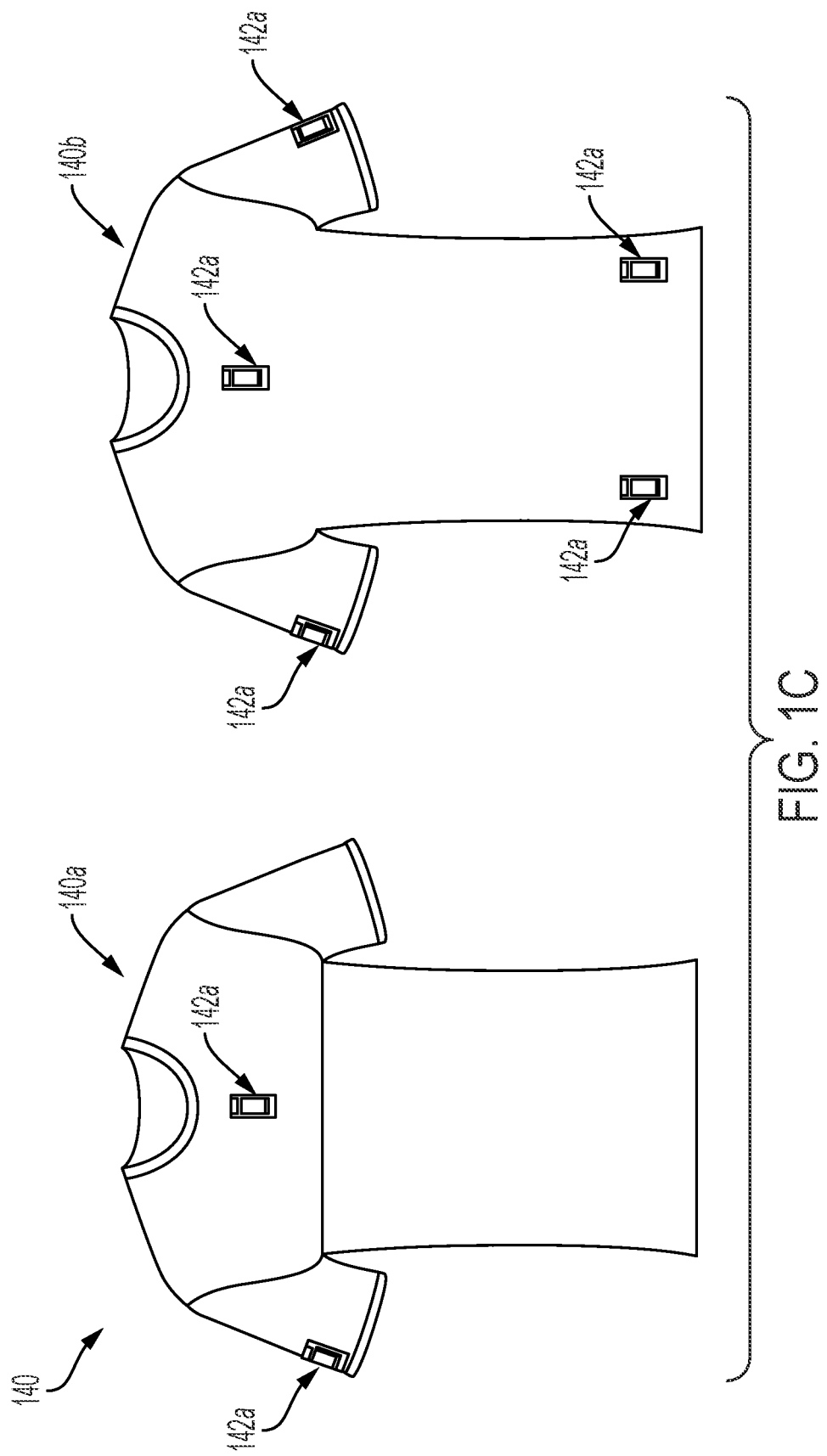
FIG. 1C is a schematic diagram of two examples of a shirt having, respectively, two and five sensor assemblies attached thereto.

Although the articles depicted in FIGS. 1A and 1B each have a single sensor assembly, multiple sensor assemblies are possible. Multiple sensor assemblies may allow for the sensing of properties (e.g., pressure, temperature, electric field, magnetic field, etc.) at different, respective locations on an article. For example, an article may be a wearable article that includes multiple sensor assemblies, each containing a position or motion sensor therein. In such a configuration, the article may better capture a position and orientation of a person wearing the article, especially during motion. FIG. 1C presents a schematic diagram of two examples of a shirt 140 having, respectively, two and five sensor assemblies 142 attached thereto. The sensors assemblies 142 each contain a motion sensor in a sensor housing thereof. The left-side of FIG. 1C depicts a shirt 140a having a sensor assembly 142a on a right-side sleeve and a chest portion. The right-side of FIG. 1C depicts a shirt 140b having a sensor assembly 142b on a right-side sleeve, a left-side sleeve, a chest portion, a left-side waist portion, and a right-side waist portion. In each case, the increased number of sensor assemblies (e.g., relative to the shirt 100a of FIG. 1A) may allow the motion sensors to better capture the motion of a person wearing the shirt 140.

Figure 2A:
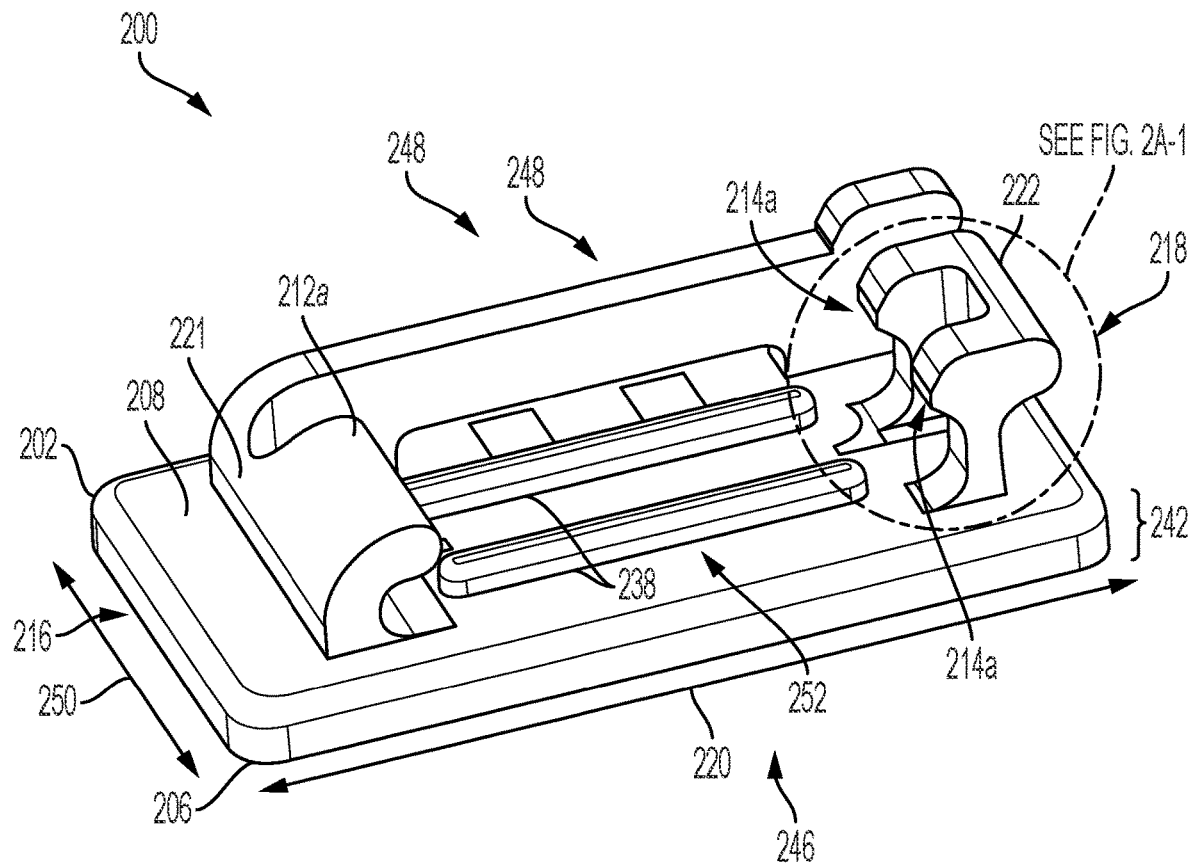
FIG. 2A is a schematic diagram, in perspective view, of an example base for a sensor assembly.
Figures 1, 2A:
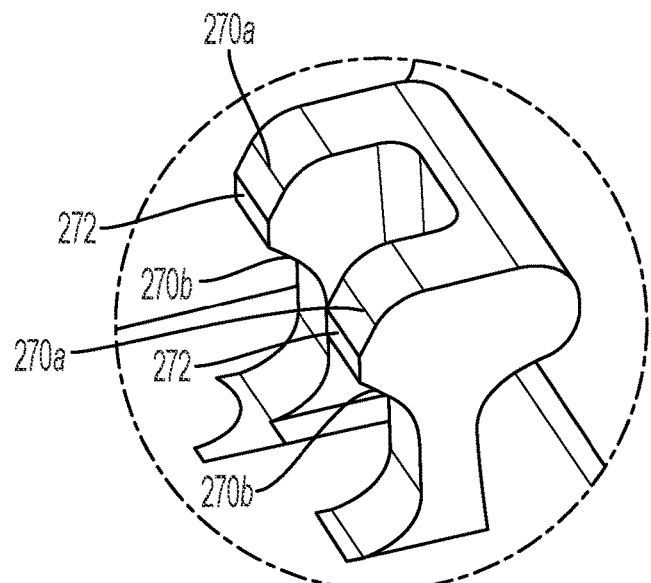
Figure 2B:
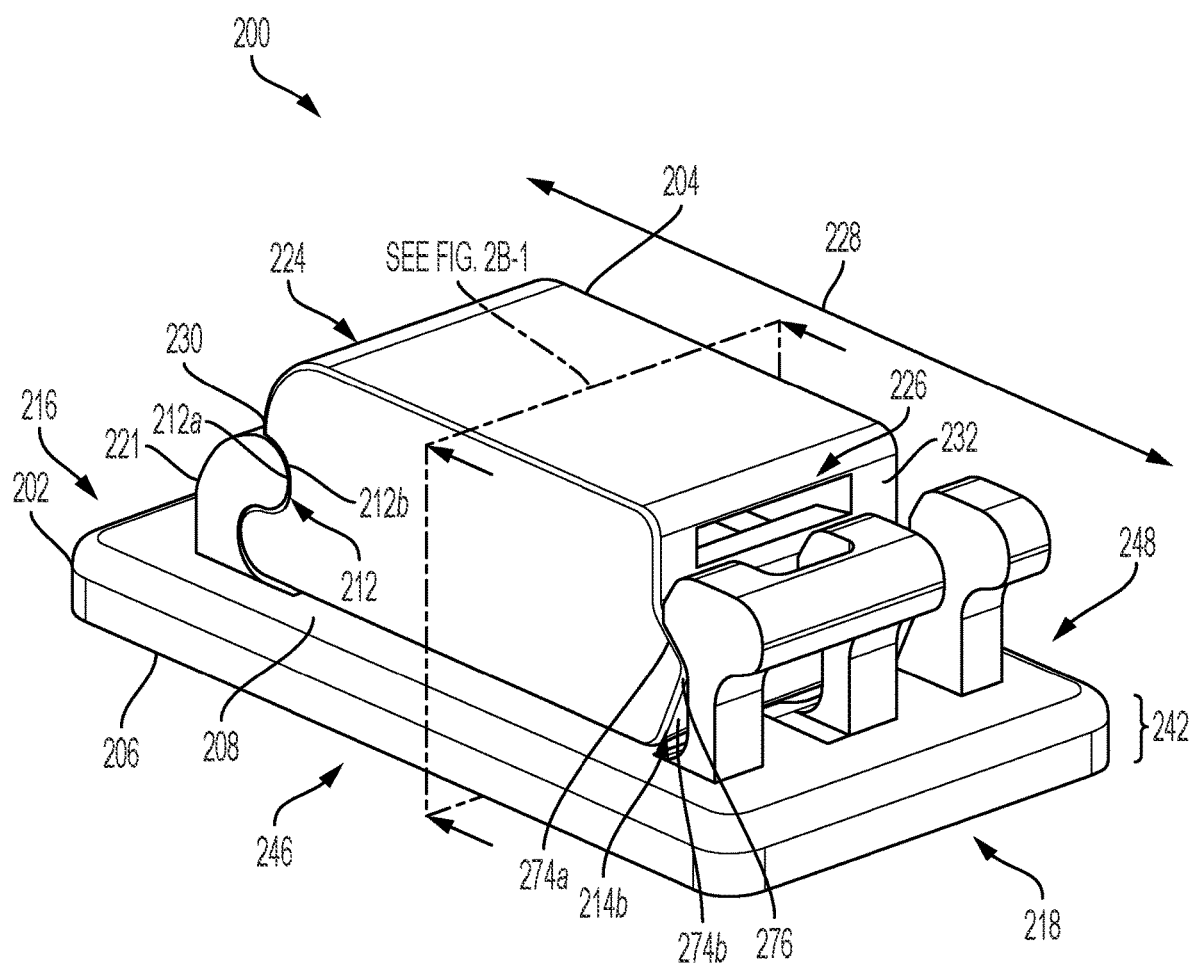
FIG. 2B is a schematic diagram, in a rear perspective view, of an example sensor housing seated on the example base of FIG. 2A.
Figures 1, 2B:
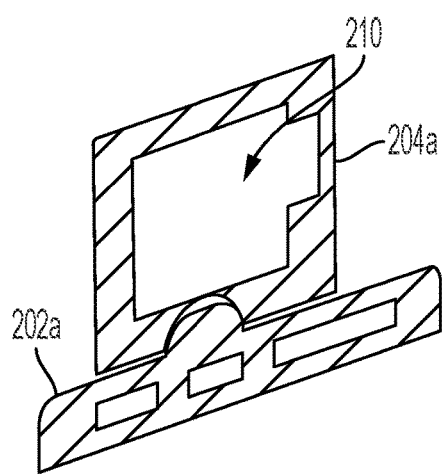

In many implementations, the sensor assembly includes features to allow the sensor housing to be secured to, and unsecured from, the base. FIG. 2A presents a schematic diagram, in perspective view, of an example base 202 for a sensor assembly 200. A cantilever portion of the example base 202 is shown in the detail view of FIG. 2A-1. FIG. 2B presents a schematic diagram, in a rear perspective view, of an example sensor housing 204 seated on the example base 202 of FIG. 2A. A portion 202a of the example base 202 and a portion 204a of the example sensor housing 204 are shown in cross-section in FIG. 2B-1. For clarity, a corresponding article is omitted from FIGS. 2A-2B. However, the sensor assembly 200 illustrated in FIGS. 2A-2B may be analogous to the sensor assemblies 102, 122, 142 described in relation to FIGS. 1A-1C.

The base 202 may be located on an article, such as by being coupled to the article, by being an integral part of the article, or some combination thereof. For example, the base 202 may include a coupling surface 206 for coupling to the article. The coupling surface 206 may be chemically bonded to a surface of the article (e.g., through an adhesive or direct chemical bond). The surface may be an interior surface, an exterior surface, or other type of surface. The coupling surface 206 may also be thermally bonded to the surface of the article, such as through an over-molding process or by fusing some or all of the coupling surface 206 to the surface of the article. The coupling surface 206 may additionally define part of a mechanical interface for coupling to the surface of the article. Examples of the mechanical interface include a snap, a zipper, eyeholes for stitching or lacing, and so forth. However, other types of coupling are possible for the base 202. In some instances, the base 202 includes a first portion coupled to the article and a second portion integral to the article.

The base 202 may also be configured to selectively seat and unseat the sensor housing 204. For example, the base 202 may include a support surface 208 configured to support the sensor housing 204 when the sensor housing 204 is seated on the base 202. The sensor housing 204 may contact some or all of the support surface 208 when seated on the base 202. The sensor housing 204 may include a cavity 210 configured to contain a sensor and an opening configured to receive the sensor into the cavity 210. For example, the sensor housing 204 may have a removable wall for selectively occluding and unoccluding the opening.

The base 202 and the sensor housing 204 may include respective pivot surfaces 212a, 212b that, when mated, define a pivot joint 212 configured to pivot the sensor housing 204 relative to the base 202 during seating and unseating. The base 202 and the sensor housing 204 may also include respective latching surfaces 214a, 214b configured to selectively secure and unsecure the sensor housing 204 to the base 202. In some variations, the pivot and latching surfaces 212a, 214a of the base 202 are at opposite ends of the base 202 and the pivot and latching surfaces 212b, 214b of the sensor housing 204 are at opposite ends of the sensor housing 204. The base 202 and the sensor housing 204 may each be formed of one or more materials that include plastic materials (e.g., ABS), elastomeric materials (e.g., silicone rubber), metallic materials (e.g., copper, brass, steel, etc.), and ceramic materials (e.g., fused silica, alumina, etc.). Other types of materials are possible. In some cases, the base 202 and the sensor housing 204 may each be formed of a non-magnetic material, for example, to avoid interference with magnetic sensing.

In some implementations, such as shown in FIGS. 2A-2B, the base 202 includes first and second base ends 216, 218 defining the opposite ends of the base 202. A base length 220 may extend between the first and second base ends 216, 218, as shown by the double-ended arrow in FIG. 2A. The base 202 also includes a base side wall 221 at the first base end 216. The base side wall 221, which may be on a front portion of the base 202, includes the pivot surface 212a of the base 202. The base 202 additionally includes a cantilever 222 at the second base end 218 that includes the latching surface 214a of the base 202. The cantilever 222 is configured to flex to allow the sensor housing 204 to seat and unseat from the base 202.

In some implementations, the sensor housing 204 includes first and second sensor housing ends 224, 226 defining the opposite ends of the sensor housing 204. A sensor housing length 228 extends between the first and second sensor housing ends 224, 226, as shown by the double-ended arrow in FIG. 2B. In many variations, the sensor housing length 228 runs parallel to the base length 220. The sensor housing 204 also includes a first sensor housing side wall 230 at the first sensor housing end 224. The first sensor housing side wall 230, which may be on a front portion of the sensor housing 204, includes the pivot surface 212b of the sensor housing 204. The sensor housing 204 additionally includes a second sensor housing side wall 232 at the second sensor housing end 226. The second sensor housing side wall 232, which may be on a rear portion of the sensor housing 204, includes the latching surface 214b of the sensor housing 204.

Figure 2C:
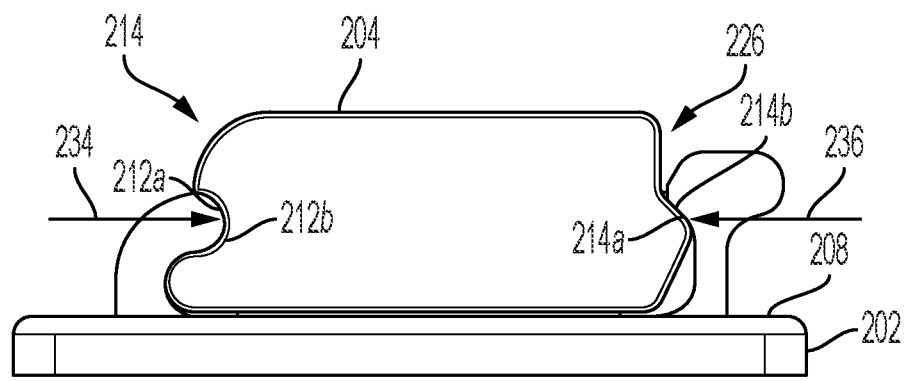
FIG. 2C is a schematic diagram, in side view, of the base and sensor housing of FIGS. 2A-2B showing an example pair of horizontal forces applied by the base to the sensor housing.

It will be appreciated that the pivot surfaces 212a, 212b and the latching surfaces 214a, 214b act collectively to secure the sensor housing 204 to the base 202 when the sensor housing 204 is fully seated on the base 202. For example, the sensor housing length 228 may extend between the opposite ends of the sensor housing 204 and define a lengthwise direction for the sensor housing 204. The pivot surfaces 212a, 212b and latching surfaces 214a, 214b are configured such that, when the sensor housing 204 is secured to the base 202 (e.g., fully-seated), the pivot and latching surfaces 212a, 214a of the base 202 apply opposing and balanced forces to the sensor housing 204 along the lengthwise direction. FIG. 2C presents a schematic diagram, in side view, of the base 202 and sensor housing 204 of FIGS. 2A-2B showing an example pair of horizontal forces 234, 236 applied by the base 202 to the sensor housing 204. The sensor housing 204 may be "squeezed" at its ends by the pair of horizontal forces 234, 236 which, due to the configuration of the pivot surfaces 212a, 212b and the latching surfaces 214a, 214b, are opposing and balanced. The pair of horizontal forces 234, 236 may thus prevent the sensor housing 204 from moving along the lengthwise direction when the sensor housing 204 is secured to the base 202. In many instances, the pivot surfaces 212a, 212b and latching surfaces 214a, 214b act collectively to ensure that the sensor housing 204, when secured, is accurately and precisely located at a desired target position along the lengthwise direction (which is horizontal in the side view of FIG. 2C).

Figure 2D:
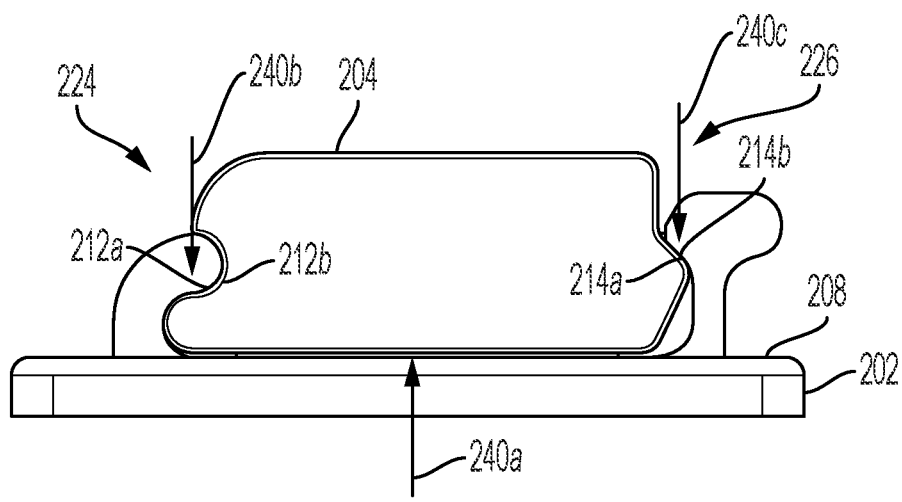
FIG. 2D is a schematic diagram, in side view, of the base and sensor housing of FIGS. 2A-2B showing an example set of vertical forces applied by the base to the sensor housing.

As another example, the base 202 may include a biasing element 238 on the support surface 208 that is configured to generate a biasing force away from the support surface 208 when compressed. The pivot surfaces 212a, 212b and latching surfaces 214a, 214b are configured such that when the sensor housing 204 is secured to the base 202, the pivot and latching surfaces 212a, 214a of the base 202 apply respective forces to the sensor housing 204 that oppose and balance the biasing force applied to the sensor housing 204 away from the support surface 208. FIG. 2D presents a schematic diagram, in side view, of an example set of vertical forces 240 applied by the base 202 to the sensor housing 204. The set of vertical forces 240 include a biasing force 240a that is opposed and balanced by first and second forces 240b, 240c applied by, respectively the pivot and latching surfaces 212a, 214a. The set of vertical forces 240 may thus prevent the sensor housing 204 from moving along a direction perpendicular to the support surface 208 (which is vertical in the side view of FIG. 2D). In many instances, the support surface 208 serves as a reference surface against which the sensor housing 204 is seated. In these instances, the pivot surfaces 212a, 212b and latching surfaces 214a, 214b may act collectively to ensure that the sensor housing 204, when secured against the support surface 208, is accurately and precisely located at a desired target position along the perpendicular direction.

Figure 2E:
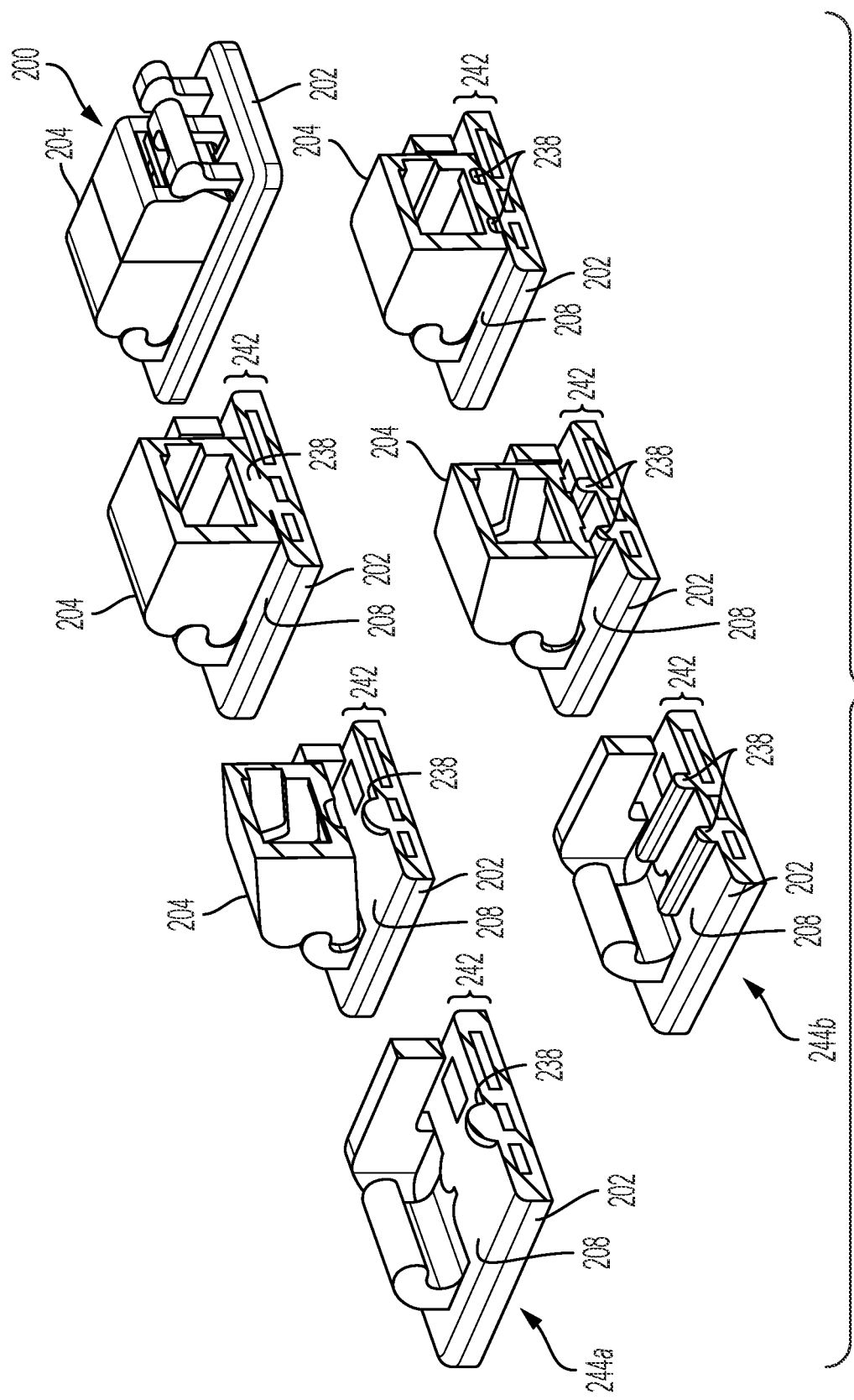
FIG. 2E is a schematic diagram, in perspective and cross-section views, of various examples of a biasing element, each formed of elastomeric material.

In some variations, the biasing element 238 is defined by elastomeric features protruding from the support surface 208. For example, the support surface 208 may be defined by a support wall 242 of the base 202. In this case, the support wall 242 may be formed at least in part of elastomeric material, and the support surface 208 includes an elastomeric surface of the elastomeric material. Moreover, the biasing element 238 includes an elastomeric protrusion defined by the elastomeric surface. FIG. 2E presents a schematic diagram, in perspective and cross-section views, of various examples 244 of the biasing element 238, each formed of elastomeric material. The upper portion of FIG. 2E shows an example 244a in which the biasing element 238 is defined by a single elastomeric bump extending outward from the support surface 208. The lower portion of FIG. 2E shows an example 244b in which the biasing element 238 is defined by a pair of linear elastomeric guides extending outward from the support surface 208. In FIGS. 2A-2B, the biasing element 238 corresponds to the pair of linear elastomeric guides. However, other types, numbers, and shapes of biasing elements 238 are possible (e.g., springs, flexible electrical contacts, pogo pins, etc.).

The sensor assembly 200 may also include features on the base 200 and the sensor housing 204 to ensure that the sensor housing 204, when secured to the base 202, is accurately and precisely located at a target position along a base width. For example, the base 202 may include third and fourth base ends 246, 248 and a base width 250 extending therebetween. The base width 250 may be perpendicular to the base length 220. The base 202 also includes a base mechanical interface 252 configured to mate with a sensor housing mechanical interface of the sensor housing 204. Such mating may allow the base and sensor housing mechanical interfaces to fix a position of the sensor housing 204 along the base width 250 when the sensor housing 204 is seated on the base 202.

In some implementations, the base mechanical interface 252 is defined by the biasing element 238. In these implementations, the sensor housing 204 may have corresponding mating features on an underside (e.g., a surface configured to contact the support surface 208) that define a sensor housing mechanical interface. In FIGS. 2A-2B, the base mechanical interface 252 is defined by the pair of linear elastomeric guides 238, and the sensor housing mechanical interface is defined by a pair of mating channels on an underside of the sensor housing 204. The base mechanical interface 252 and the sensor housing mechanical interface may define an interference fit so that the pair of mating changes compresses the part of linear elastomeric guides 238 when the base and sensor housing mechanical interfaces mate. However, other types of fits are possible. In some variations, the base mechanical interface 252 may be configured to guide (e.g., auto-position) the sensor housing 204 into the target position along the base width 250 when the sensor housing 204 is seated onto the base 202. To do so, the base mechanical interface 252 may include one or more guide surfaces. For example, FIGS. 2A-2B depict the pair of linear elastomeric guides 238 as having radiused surfaces running along their outer edges. However, other types of guide surfaces are possible, including different guide structures.

For example, the base mechanical interface 252 may include a protrusion on the support wall 242 extending from the support surface 208. The protrusion may be different from the biasing element 238. In this case, the sensor housing mechanical interface may include a recess in a bottom side wall of the sensor housing 204 that is configured to mate with the protrusion when the sensor housing 204 is disposed against the support wall 208.

Figure 2F:
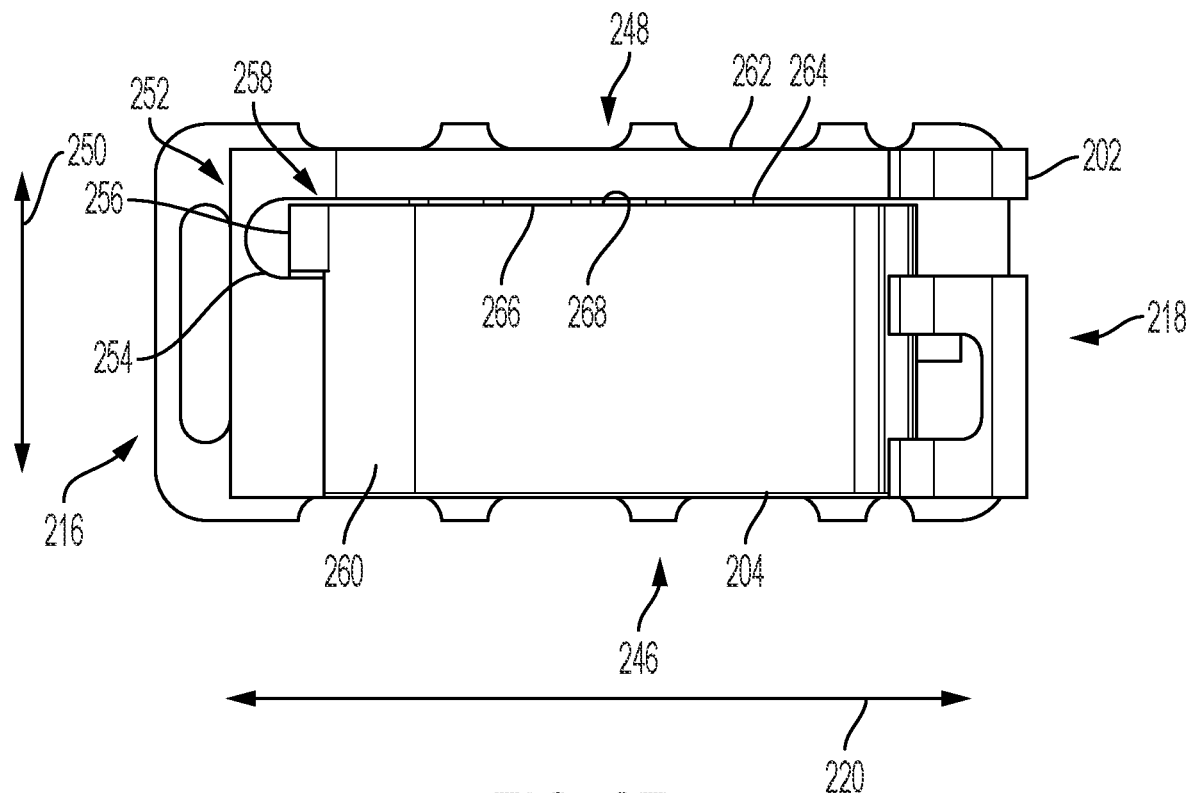
FIG. 2F is a schematic diagram, in top view, of the base and the sensor housing of FIGS. 2A-2B that include, respectively, an example recess and an example protrusion for defining mating mechanical interfaces.
Figure 2G:
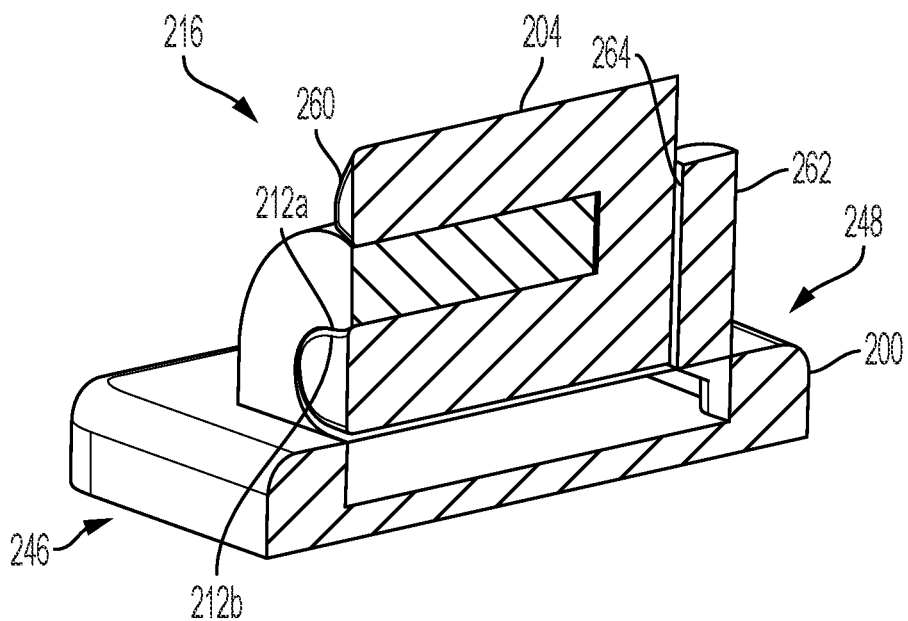
FIG. 2G is a schematic diagram, in perspective view, of the base and the sensor housing illustrated in FIG. 2F, but showing a cross-section of the example recess and the example notch.
Figure 2H:
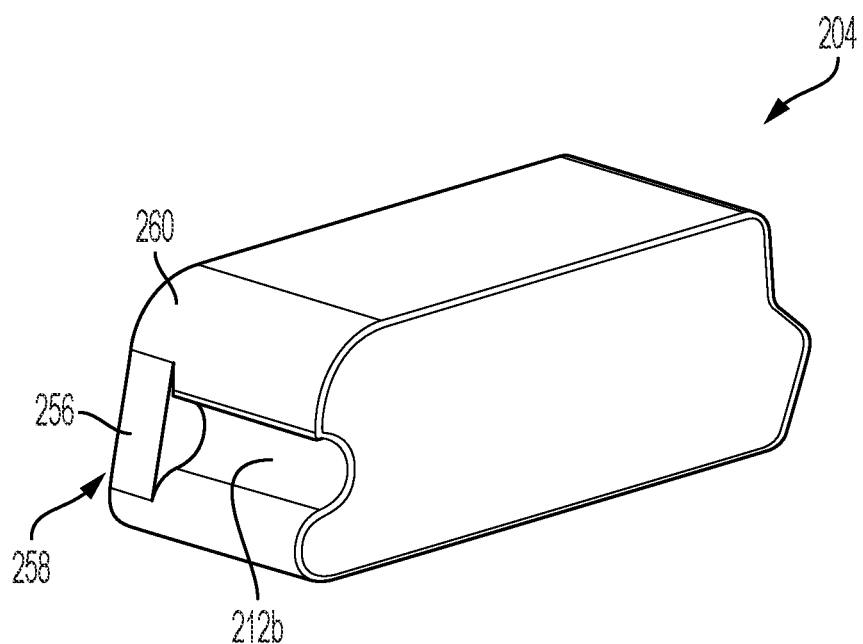
FIG. 2H is a schematic diagram, in perspective view, of the sensor housing illustrated in FIG. 2F but oriented to show the example protrusion 256 and the sensor housing mechanical interface.

As another example, the base mechanical interface 252 may include a notch or recess in a side wall of the base 202 to set the sensor housing 204 in a desired target position along the base width 250. FIG. 2F presents a schematic diagram, in top view, of the base 202 and the sensor housing 204 of FIGS. 2A-2B that include, respectively, an example recess 254 and an example protrusion 256 for defining mating mechanical interfaces. The recess 254 and the protrusion 256 may help define the base mechanical interface 252 and the sensor housing mechanical interface 258. FIG. 2G presents a schematic diagram, in perspective view, of the base 202 and the sensor housing 204 illustrated in FIG. 2F but showing a cross-section of the example recess 254 and the example notch 256. FIG. 2H presents a schematic diagram, in perspective view, of the sensor housing 204 illustrated in FIG. 2F but oriented to show the example protrusion 256 and the sensor housing mechanical interface 258. The example protrusion 256 may, in certain cases, help align the sensor housing 204 with the base 202, such as during initial insertion of the sensor housing 204 into the base 202.

In some implementations, the base mechanical interface 258 includes the base side wall 221, which may be disposed at the first base end 216 or the second base end 218. FIGS. 2F-2H illustrate the case where the base side wall 221 is disposed at the first base end 216. The base side wall 221 may extend between the third and fourth base ends 246, 248 and be parallel to a direction defined by the base width 250. The base mechanical interface 258 also includes the recess 254, which is disposed in the base side wall 221. The recess 254 may face an interior of the base 202 and be oriented parallel to a direction defined by the base length 250. In these implementations, the sensor housing mechanical interface 258 may include the protrusion 256, which extends outward from a sensor housing side wall 260 of the sensor housing 204. The protrusion 256 is configured to mate with the recess 254 in the base side wall 221 when the pivot surfaces 212a, 212b of the base 202 and sensor housing 204 are mated.

In yet another example, the sensor mechanical interface 258 may include a wall configured to contact a wall of the base mechanical interface 252 to help set the sensor housing 204 in a desired target position along the base width 250. In some implementations, the base mechanical interface 252 may include a base side wall 262 disposed at the third or fourth base ends 246, 248 and extending between the first and second base ends 216, 218. FIGS. 2F-2G illustrate the case where the base side wall 262 is disposed at the fourth base end 248. The base side wall 262 may run parallel to a direction defined by the base length 220 and include an exterior surface 264 facing an interior of the base 202. In these implementations, the sensor housing mechanical interface 258 may include a second sensor housing side wall 266 extending between the opposite ends of the sensor housing 204. The second sensor housing side wall 266 may have an exterior surface 268 configured to mate against the exterior surface 264 of the base side wall 262 when the pivot surfaces 212a, 212b of the base 202 and sensor housing 204 are mated.

Now referring back to FIGS. 2A-2B, the sensor assembly 200 may be configured so that the sensor housing 204 can be repeatedly seated and unseated from the base 202 in an accurate and precise target position. Such motion may be facilitated by the pivot surfaces 212a, 212b and latching surfaces 214a, 214b. The pivot surfaces 212a, 212b and latching surfaces 214a, 214b may also allow the sensor housing 204 (and sensor contained therein) to be selectively attached to, and detached from, an article to which the base 200 is coupled. In many implementations, latching surfaces 214a, 214b each include lower and upper portions. For example, the latching surface 214a of the base 202 may include a pair of angled cantilever surfaces 270a, 270b that define a ridge 272 on the cantilever 222 of the base 202, with the pair of angled cantilever surfaces 270a, 270b disposed on opposite sides of the ridge 272. Similarly, the latching surface 214b of the sensor housing 204 may include a pair of angled sensor housing surfaces 274a, 274b that define a ridge 276 on the second sensor housing side wall 232, with the pair of angled sensor housing surfaces 274a, 274b disposed on opposite sides of the ridge 276. The lower and upper portions of the latching surfaces 214a, 214b may assist in securing the sensor housing 204 to the base 202 when the sensor housing 204 is seated.

FIGS. 3A-3F present respective schematic diagrams, in side view, of example pivot positions for an sensor assembly 300 in which a sensor housing 304 is progressively seated onto a base 302. The sensor assembly 300 may be analogous to the sensor assembly 200 described in relation to FIGS. 2A-2H. Features common to both FIGS. 3A-3F and FIGS. 2A-2H are related via coordinated numerals that differ in increment by one hundred. For clarity, the sensor housing 304 and the base side wall 321, and the cantilever 322 are shown in cross-section in FIGS. 3A-3F.

Figure 3A:
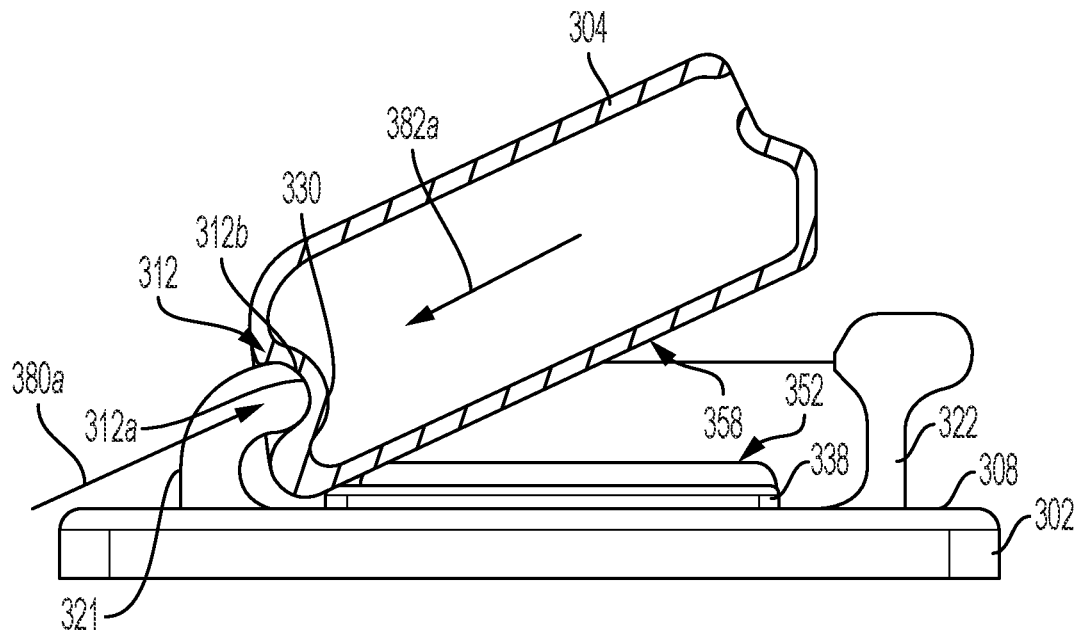
FIG. 3A-3F are respective schematic diagrams, in side view, of example pivot positions for a sensor assembly in which a sensor housing is progressively seated onto a base.
Figure 3B:
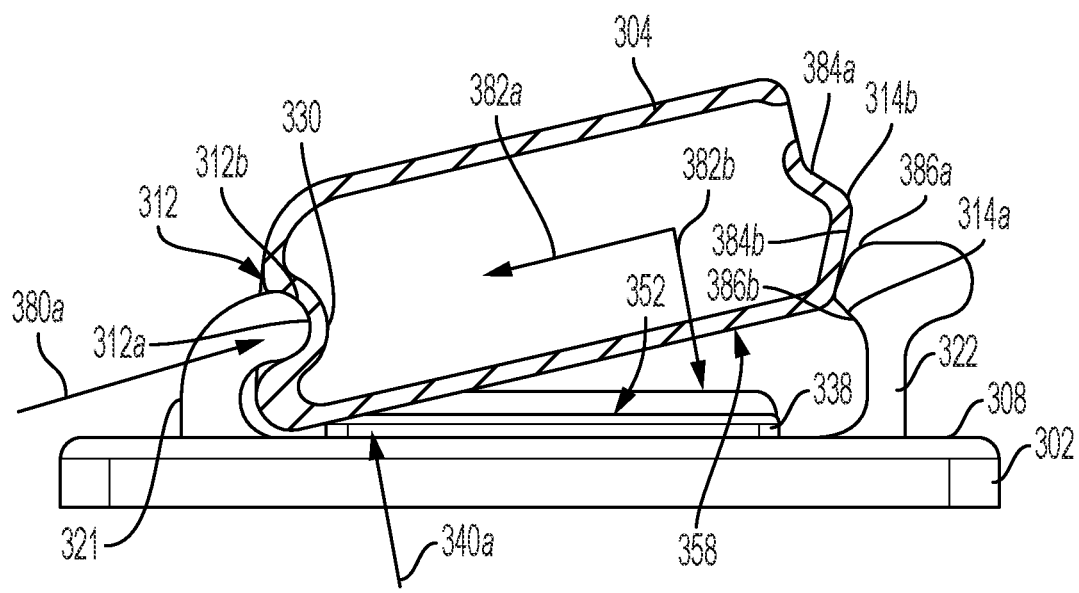

In FIG. 3A, the sensor housing 304 is inserted into the base 302, which may include contacting (or mating) the pivot surface 312a of the base 302 with the pivot surface 312b of the sensor housing 304. During such contact, the pivot joint 312 is formed and a reaction force 380a may emerge from the pivot surface 312a of the base 302 to counteract an insertion force 382a from the pivot surface 312b of the sensor housing 304. From this example pivot position, the sensor housing 304 may then be pivoted about the pivot joint 312 into a first pivot position where the lower portion 384b of the latching surface 314b of the sensor housing 304 first begins to engage the upper portion 386a of the latching surface 314a of the base 302. FIG. 3B shows the sensor housing 304 in the first pivot position. The first pivot position may also correspond to contact between the biasing element 338 and the sensor housing 304 as the base and sensor housing mechanical interfaces 352, 358 mate. Such contact may require the formation of a second insertion force 382b to overcome a biasing force 340a from the biasing element 338, which resists rotation of the sensor housing 304 about the pivot joint 312.

Figure 3C:
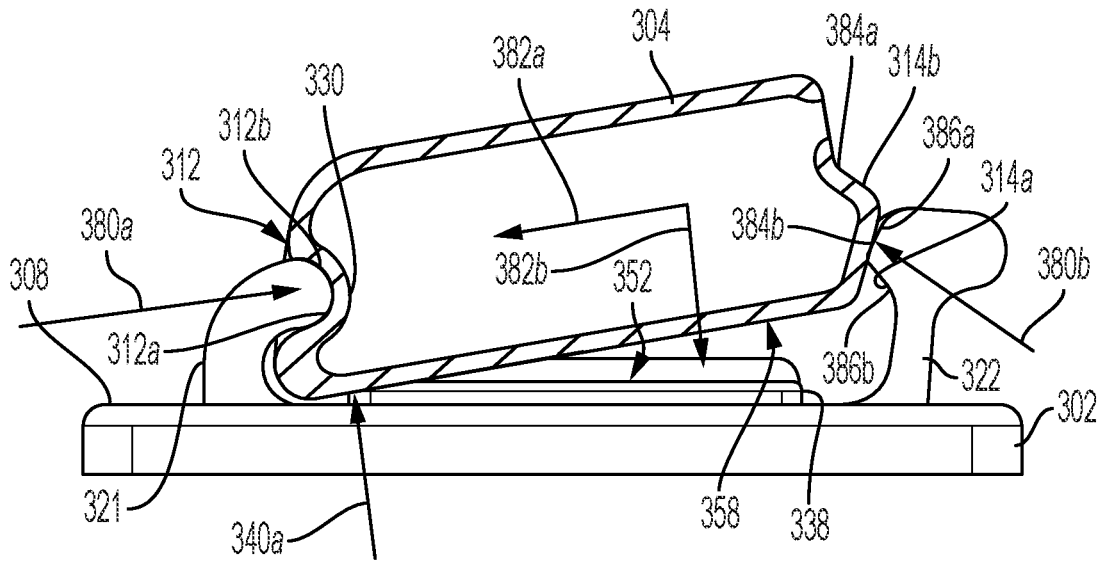
Figure 3D:
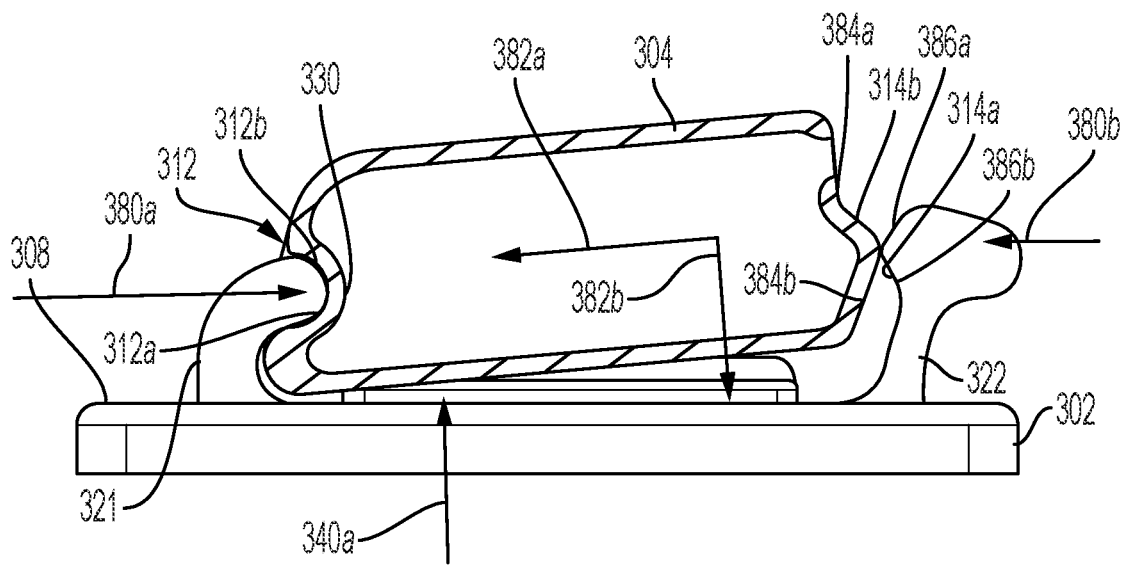

The sensor housing 304 may be further pivoted from the first pivot position to a second pivot position, during which, the lower portion 384b of the latching surface 314b of the sensor housing 304 slides against the upper portion 386a of the latching surface 314a of the base 302. FIG. 3C shows the sensor housing 304 transitioning from the first pivot position towards the second pivot position. Sliding contact between the lower and upper portions 384b, 386a may induce the cantilever 322 to displace away from the sensor housing 304, such as from an unflexed position towards a flexed position. As a result, the cantilever 322 may apply a second reaction force 380b to the sensor housing 304. A portion of the second reaction force 380b (e.g., a component thereof) may be oriented away from the base 302, thereby resisting the motion of the sensor housing 304 and requiring the insertion force 382 to be increased in order to continue the rotation of the sensor housing 304. The cantilever 322 may experience a maximum displacement when the sensor housing 304 reaches the second pivot position, and in doing so, may reach the flexed position. FIG. 3D shows the sensor housing 304 at the second pivot position, with the cantilever 322 being fully displaced from its unflexed position.

Figure 3E:
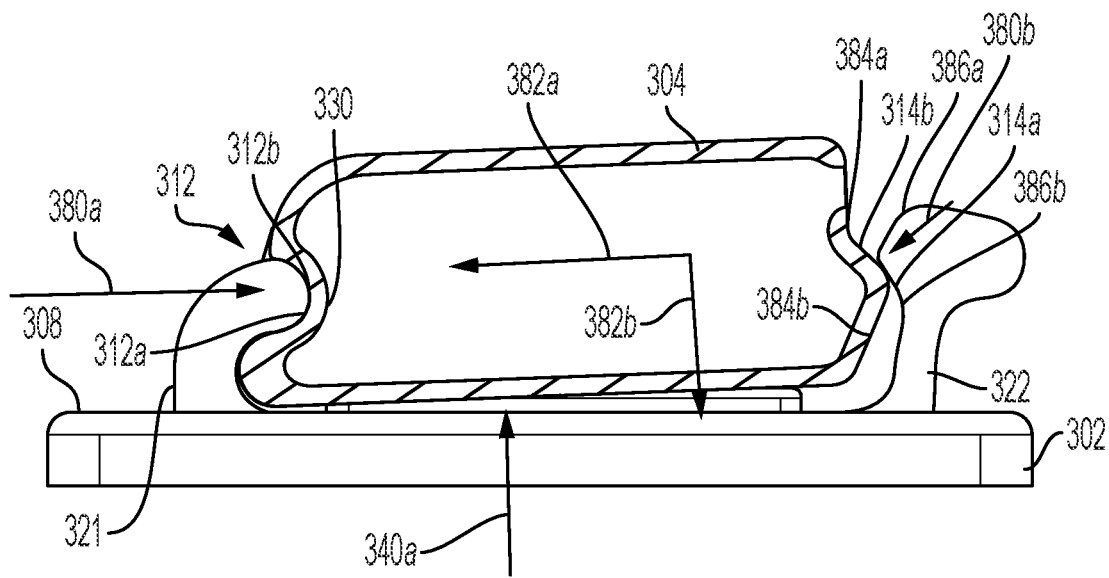
Figure 3F:
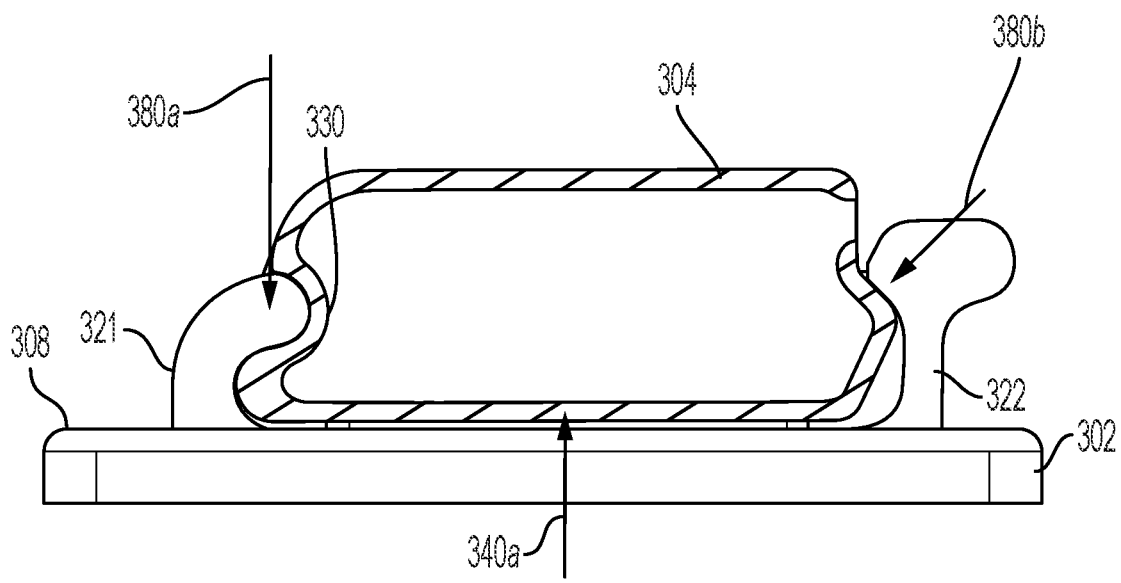

To secure the sensor housing 304 to the base 302, the sensor housing 304 may be pivoted from the second pivot position to a third pivot position. During such motion, the upper portion 384a of the latching surface 314b of the sensor housing 304 may slide against the lower portion 386b of the latching surface 314a of the base 302. Moreover, the cantilever 322 may displace towards the sensor housing 304, such as from the flexed position towards the unflexed position. This displacement may result in the cantilever "snapping" back into the unflex positioned. The displacement may also reorient the second reaction force 380b such that a portion thereof (e.g., a component) is directed towards the base, thereby offsetting part of the biasing force 340a. FIG. 3E shows the sensor housing 304 transitioning from the second pivot position towards the third pivot position. The sensor housing 304 may reach the third pivot position when fully seated against the base 302 (e.g., against the support surface 308 of the base 302). While in the third pivot position, the reaction forces 380a, 380b and the biasing force 340a may be balanced, thereby securing the sensor housing 304 to the base 302. These forces may be analogous to the horizontal and vertical forces 234, 236, 240 described in relation to FIGS. 2C-2D. FIG. 3F shows the sensor housing 304 in the third pivot position.

When the sensor housing 304 is in the third pivot position, the pivot surfaces 312a, 312b and the latching surfaces 314a, 314b may act collectively with the base and sensor housing mechanical interfaces 352, 358 (now mated) to fully constrain the sensor housing 304. This constraint may ensure the sensor housing 304 does not move after being secured to the base 302. The pivot and latching surfaces 312a, 312b, 314a, 314b and the base and sensor housing mechanical interfaces 352, 358 may also be configured to prevent the sensor housing 304 from being inserted (or seated) in a wrong position or orientation. To unseat the sensor housing 304 from the base 302, the seating stages described above may be reversed in order. However, in many implementations, the latching surface 314a of the base 302 is simply displaced away from the latching surface 314b of the sensor housing 304 to create a gap between the sensor housing 304 and the base 302. In these implementations, the sensor housing 304 may be removed from the base 302 by unmating the pivot surface 312b of the sensor housing 304 from the pivot surface 312a of the base 302. For example, the cantilever 322 may be displaced slightly past its flexed position to create the gap. When the gap is created, the compression force 340a may no longer be balanced and the sensor housing 304 may eject from and/or pivot about the pivot joint 312 such that the lower portion 384b is above the lower portion 386b. In this case, the pivot joint 312 can easily be disassembled, thereby allowing the sensor housing 304 to be removed from the base 302.

Rotation of the sensor housing 304 about the pivot joint 312 may be facilitated by coincident axes that are formed when the pivot surfaces 312a, 312b mate. For example, as shown in FIGS. 3A-3F, the pivot surface 312a of the base 302 may include a convex semicylindrical surface that defines a rounded end of a base side wall 321. The convex semicylindrical surface may extend along a first longitudinal axis. Similarly, the pivot surface 312b of the sensor housing 304 may include a concave semicylindrical surface that defines a channel in the sensor housing side wall 330. The convex semicylindrical surface extends along a second longitudinal axis. In this configuration, the channel is configured to mate with the rounded end such that the first and second longitudinal axes become coincident, thereby defining a common axis of rotation. However, other configurations are possible for the pivot joint 312.

Figure 4:
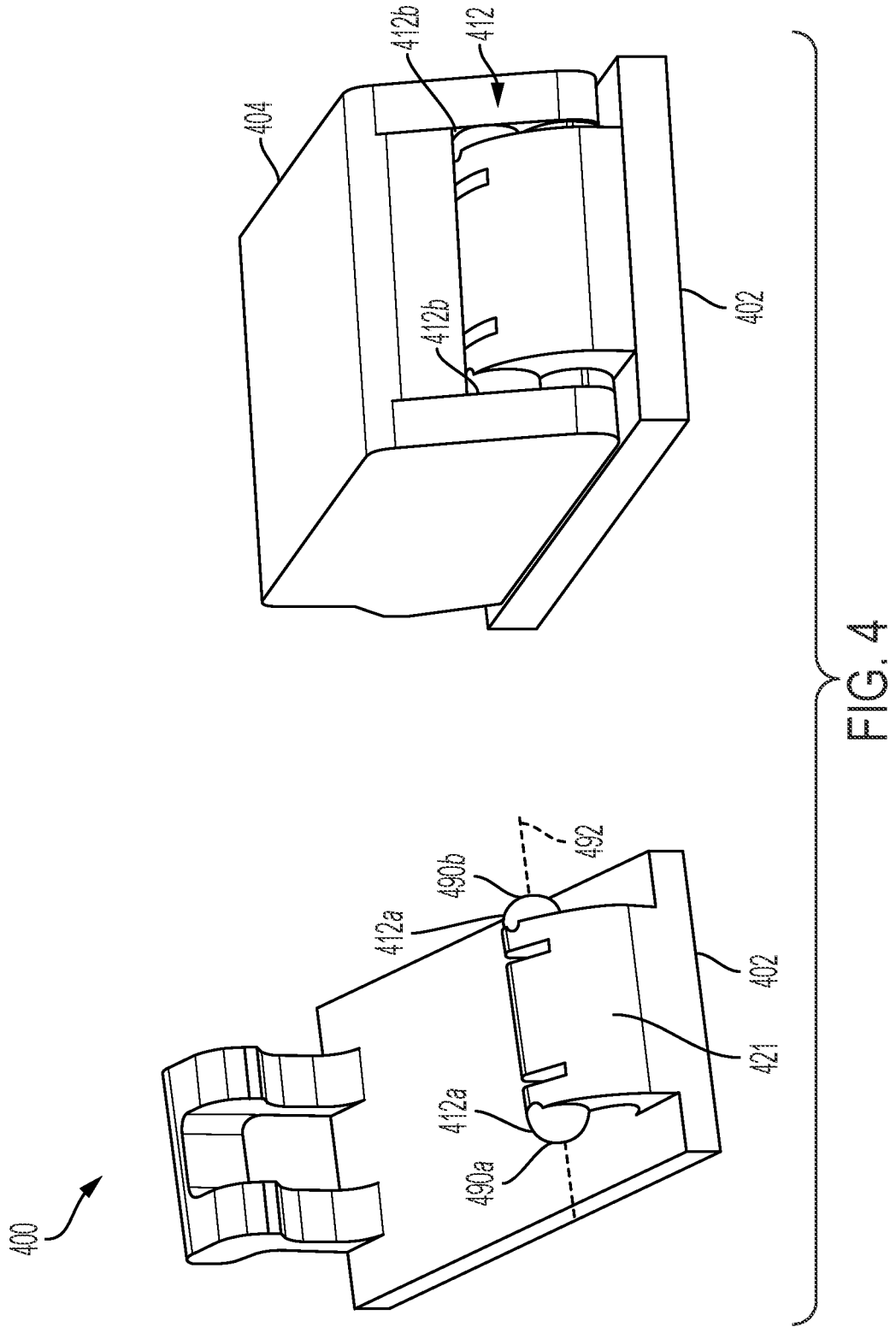
FIG. 4 is a schematic diagram, in perspective view, of an example sensor assembly in which a pivot joint is defined by mating hemispherical surfaces.

Now referring to FIG. 4, a schematic diagram is presented, in perspective view, of an example sensor assembly 400 in which a pivot joint 412 is defined by mating hemispherical surfaces. The example sensor assembly 400 may be analogous to the sensor assembly 200 described in relation to FIGS. 2A-2H. Features common to both FIG. 4 and FIGS. 2A-2H are related via coordinated numerals that differ in increment by two hundred. In FIG. 4, the pivot surface 412a of the base 402 includes a pair of convex hemispherical surfaces 490a, 490b defining respective bumps on opposite sides of a base side wall 421. The bumps include respective center axes disposed along a first longitudinal axis 492 and aligned therewith. Similarly, the pivot surface 412b of the sensor housing 404 includes a pair of concave hemispherical surfaces defining respective dimples on opposing interior sides of the sensor housing. The dimples include respective center axes disposed along a second longitudinal axis and aligned therewith. The bumps are configured to mate with the dimples such that the first and second longitudinal axes become coincident, thereby defining a common axis of rotation.

In some implementations, the sensor assembly is configured to selectively attach and detach a sensor to a glove (e.g., a sensor glove). In these implementations, the base of the sensor assembly may be coupled to the glove (e.g., to an exterior surface of the glove), may be an integral part of the glove, or some combination thereof. Moreover, the sensor may be disposed in the cavity of the sensor housing. An electrical wire may run exterior to the glove and have a wire end coupled to the sensor. The wire end may, for example, be disposed through the opening of the sensor housing. In some variations, the sensor is a motion sensor configured to sense one or more of a position, a velocity, and an acceleration. The motion sensor may be configured to generate sensor signals in response to motion of the glove. In some variations, the sensor is a magnetic sensor configured to sense the strength of a magnetic field, such as produced by a magnetic field generator. An example of the magnetic field generator is described in U.S. Pat. No. 10,276,289 entitled "Rotating a Permanent Magnetic in a Position Detection System." In some variations, the sensor is a position sensor configured to detect a position and an orientation of the glove (or portion thereof). Examples of the position sensor are described in U.S. Pat. No. 10,276,289.

Figure 5A:
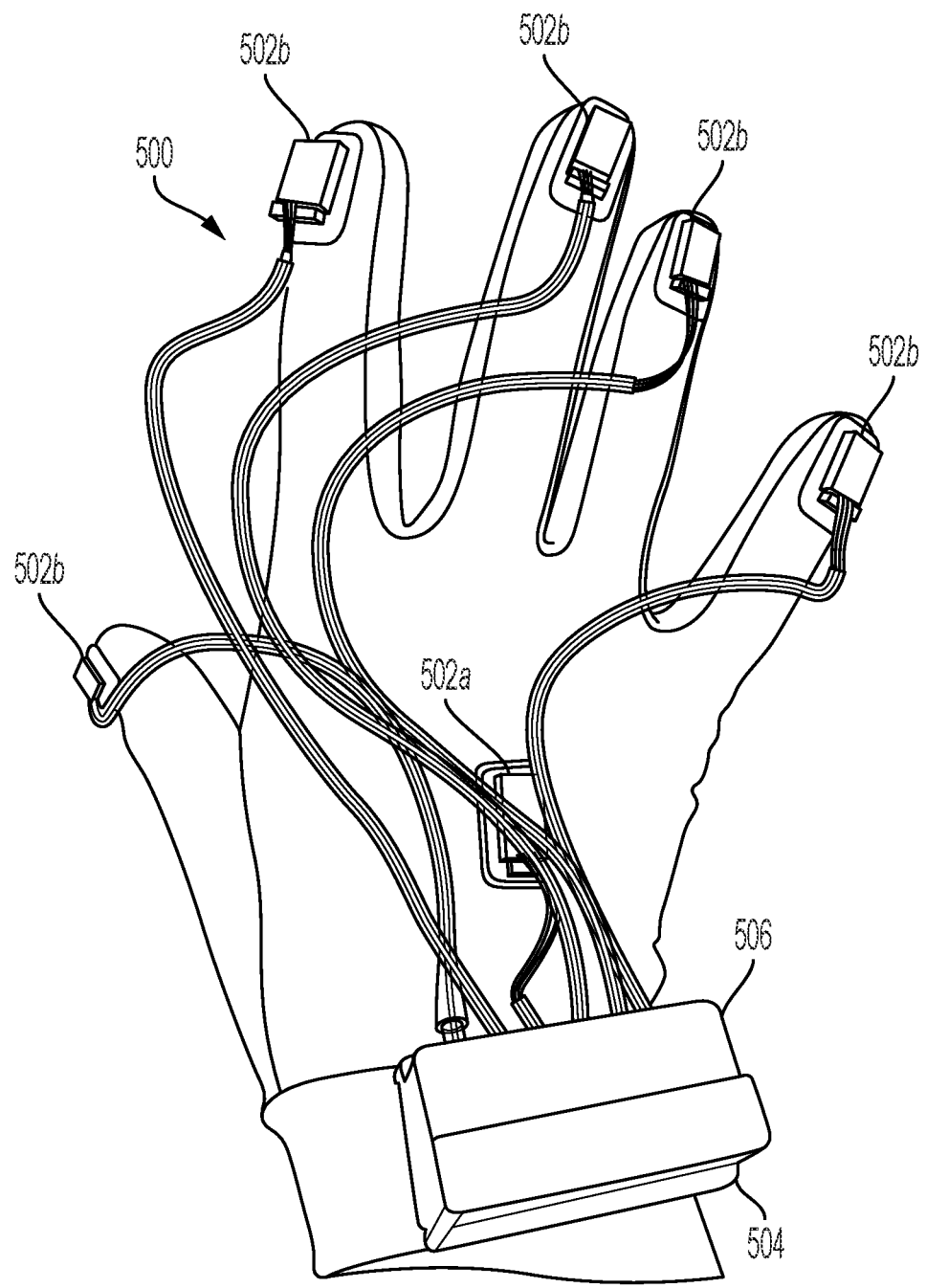
FIG. 5A is a schematic diagram, in top view, of an example sensor glove that includes multiple sensor assemblies.

FIG. 5A presents a schematic diagram, in top view, of an example sensor glove 500 that includes multiple sensor assemblies 502. The glove 500 includes a glove shell made of fabric. In some cases, the glove shell can be made of a web material, a plastic material, an elastomeric material, or others. The glove shell has an outer surface that defines an exterior of the glove shell and an inner surface that defines an interior of the glove shell. The interior of the glove shell is shaped to receive a human hand, and the exterior of the glove shell has the general shape of a human hand, as shown in FIG. 5A. In particular, the glove shell has a dorsal side (back side) and a volar side (palm side) and five digits (fingers and thumb) extending from the central hand region of the glove shell.

Figure 5B:
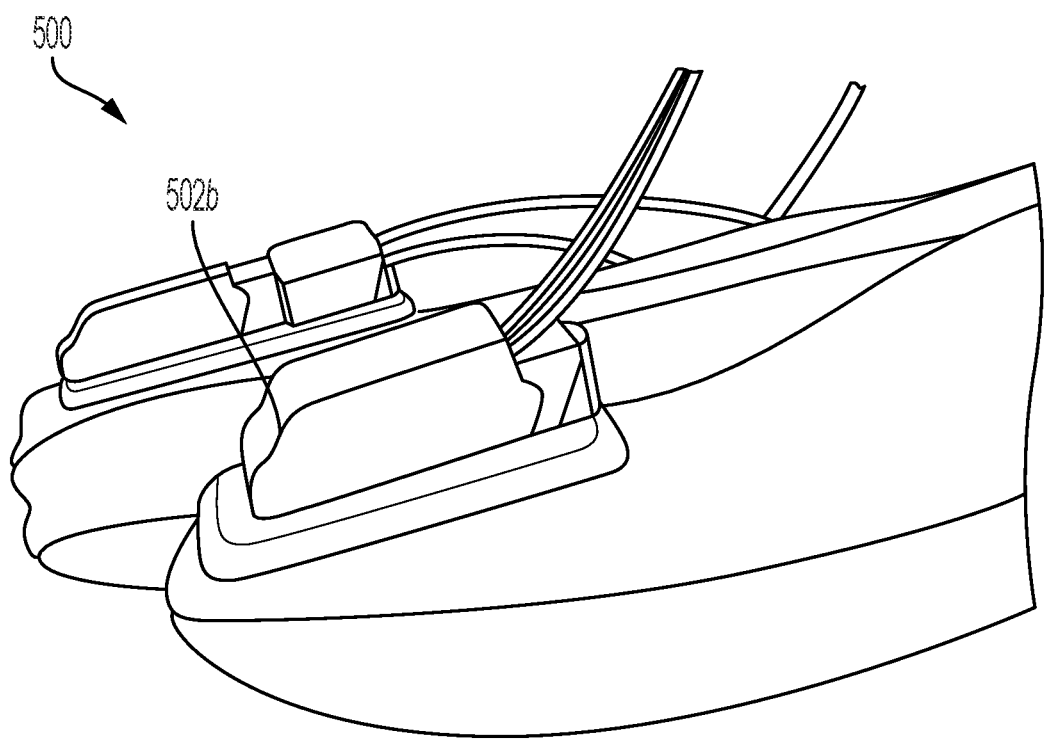
FIG. 5B is a schematic diagram, in detail view, the example sensor glove of FIG. 5A showing a sensor assembly coupled to the distal phalange of an index finger.

The example sensor glove 500 shown in FIG. 5A includes a sensor assembly 502a on the exterior of the glove shell and located on a dorsal side of a hand opposite a center of its palm. The example sensor glove 500 also includes a sensor assembly 502b on the exterior of the glove shell adjacent each digit of the hand (e.g., a finger or a thumb). For example, the sensor glove 500 may include a digit portion configured to fit conformally over a digit of the hand. The sensor assemblies 502b may be located on a digit portion at a distal phalange for each digit, thereby allowing sensing near the fingertips of the hand. In some variations, the base of the sensor assembly 502b has a base length no greater than a length of the distal phalange and aligned therewith. FIG. 5B presents a schematic diagram, in detail view, the example sensor glove of FIG. 5A showing a sensor assembly 502b coupled to the distal phalange of an index finger.

In some variations, the base of the sensor assembly 502b is coupled to the external surface of the digit portion such that the pivot surface of the base is located closest to a distal end of the digit. In these variations, the latching surface of the base is also located closest to a proximal end of the digit. In some variations, such as shown in FIG. 5A, the sensor glove 500 includes a digit portion for each digit of the hand. In these variations, a sensor assembly 502b may be coupled to an external surface of each digit portion. However, other numbers and locations are possible for the sensor assembly 502, including locations that are an integral part of the glove shell.

The glove shell of the sensor glove 500 additionally includes a wrist portion configured to cover a wrist of the hand. The wrist portion may include a portion of the external surface of the glove shell that is located on the dorsal side of the hand adjacent the wrist. A second base 504 is coupled to this portion of the external surface and is configured to selectively seat and unseat an electronics housing 506. The electronics housing 506 may contain electronics configured to receive sensor signals from the sensors in the sensor assemblies 502 and, in response, generate data representing properties measured by the sensor. The electronics may include, for example, a microprocessor, memory, capacitors, inductors, resistors, and so forth disposed on a circuit board. In variations where the sensors are motion sensors, the electronics may be configured to generate data representing one or more of a position, a velocity, and an acceleration of the sensor assemblies 502 of the sensor glove. This data may be used to determine motion properties of the sensor glove 500, such as a position, an orientation, a shape, a velocity, and an acceleration of the sensor glove 500. Other characteristics, however, are possible. In some variations, the sensors carried by the sensor glove 500 may be part of a system for tracking motion that includes a magnetic field generator. An example of the magnetic field generator is described in U.S. Pat. No. 10,276,289 entitled "Rotating a Permanent Magnetic in a Position Detection System." In certain cases, the system is configured as described in U.S. Pat. No. 10,151,606 entitled "Tracking Position and Movement Using a Magnetic Field."

Figure 6A:
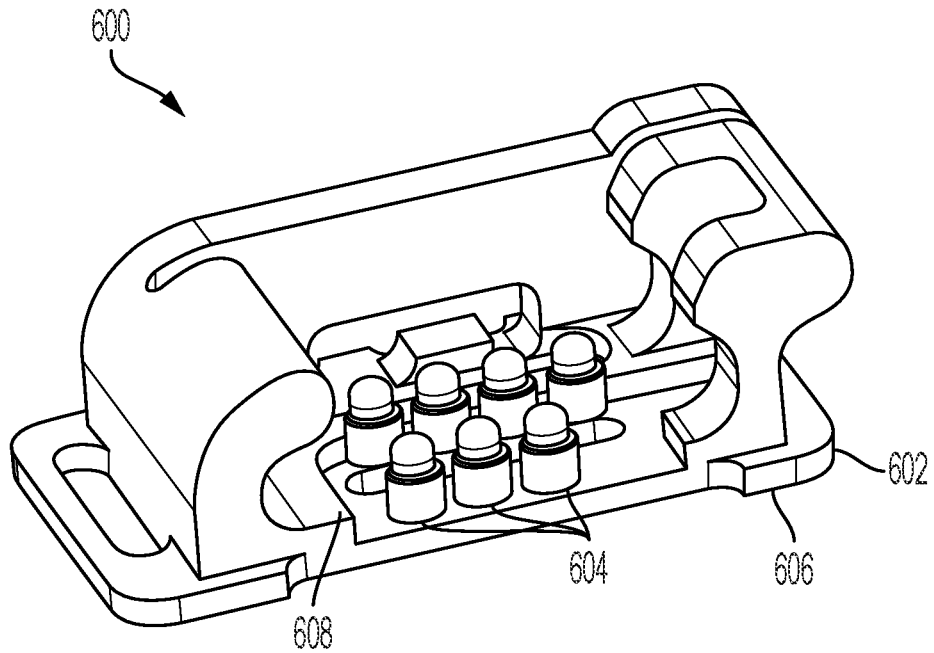
FIG. 6A is a schematic diagram, in perspective view, of an example base having a support wall and electrical pins disposed therethrough.
Figure 6B:
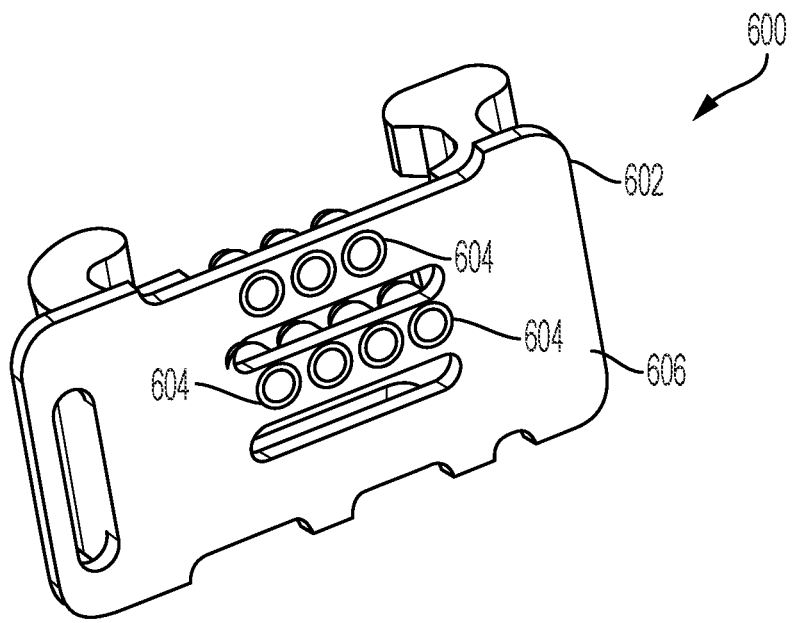
FIG. 6B is a schematic diagram, in bottom view, of the example base of FIG. 6A, showing a coupling surface of the example base.

FIGS. 5A-5B depict the sensor assemblies 502 and the electronics housing 504 connected by electrical wires external to the sensor glove 500. However, electrical connections internal to the sensor glove are possible. FIG. 6A presents a schematic diagram, in perspective view, of an example base 600 having a support wall 602 and electrical pins 604 disposed therethrough. The support wall 602 extends between the opposite ends of the base 600 and includes a coupling surface 606 configured to be coupled to an external surface of a glove (e.g., the sensor glove 500 of FIGS. 5A-5B). FIG. 6B presents a schematic diagram, in bottom view, of the example base 600 of FIG. 6A, showing the coupling surface 606 of the base 600. The support wall 602 also includes a support surface 608 configured to support a sensor housing when the sensor housing is seated on the base 600. The electrical pins 604 extend through the support wall 602 and past the support surface 608. The electrical pins 604 may be fixed in position, or in some cases, be configured to move in response to contact (e.g., pogo pins). The sensor housing may include holes aligned with respective electrical contacts of the sensor when the sensor is disposed in the sensor housing. The holes may be configured to allow the electrical pins 604 to engage corresponding electrical contacts of the sensor when the sensor housing is seated on the base 600 (see, for example, FIG. 6E). In some variations, however, the sensor housing may include electrical contacts (e.g., conductive pads) that are an integral part of a bottom wall of the sensor housing. In further variations, the electrical contacts extend between first and second ends, with the first end being configured to couple to a respective electrical contact of the sensor and the second end being configured to couple to a respective electrical pin 604.

Figure 6C:
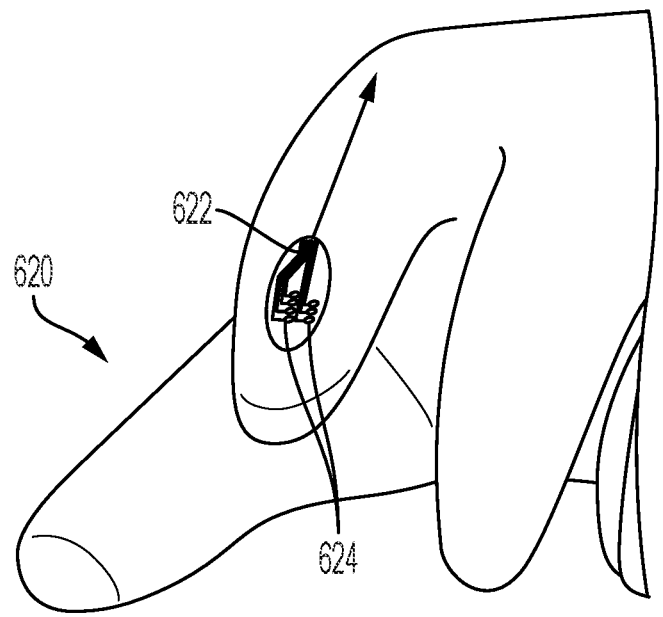
FIG. 6C is a schematic diagram, in perspective view, of a digit portion of an example glove that has electrical traces integral to the example glove.
Figure 6D:
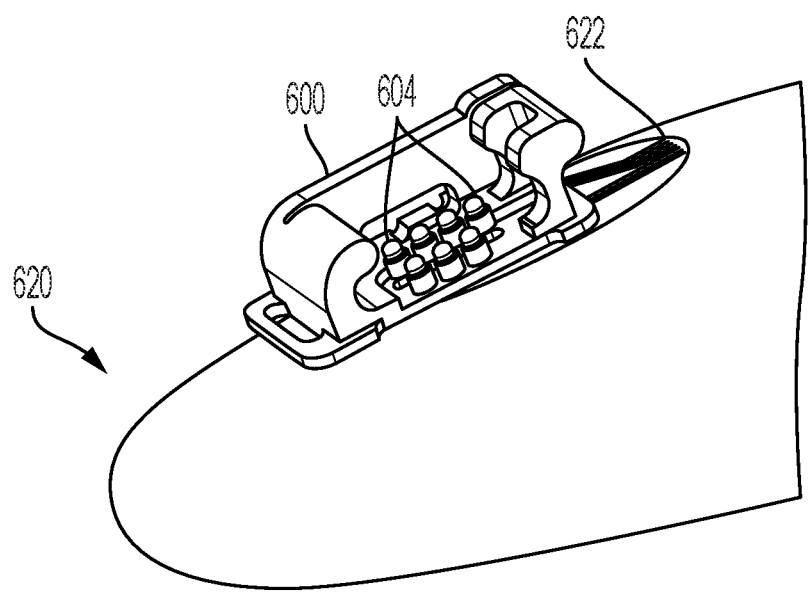
FIG. 6D is a schematic diagram, in perspective view, of the example base of FIG. 6A coupled to the distal portion of the example glove of FIG. 6C.
Figure 6E:
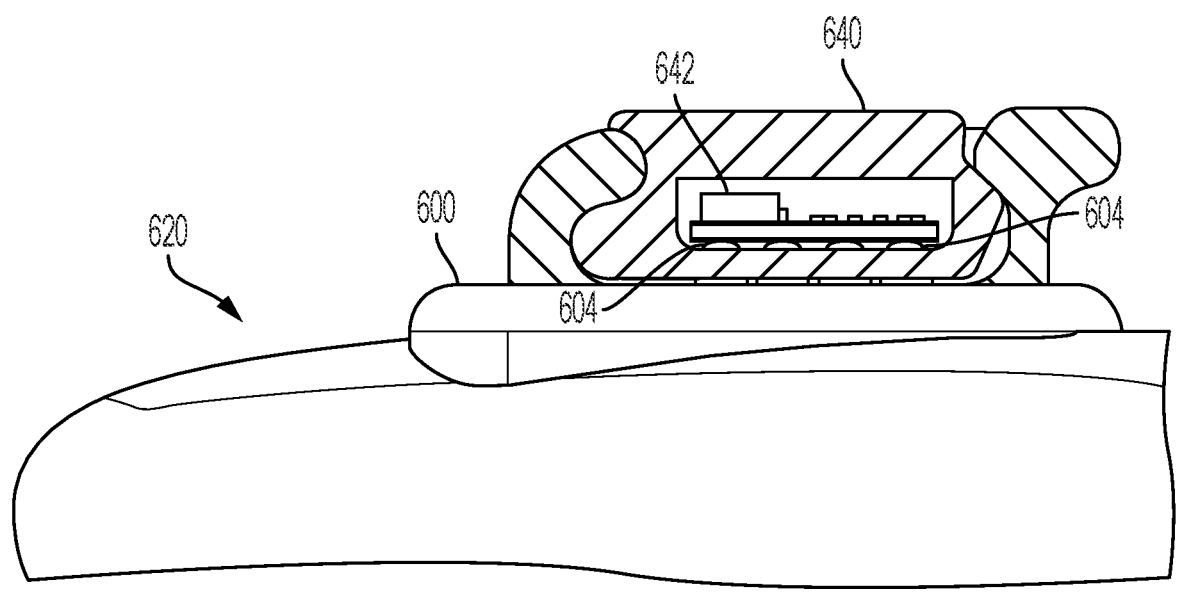
FIG. 6E is a schematic diagram, in side view, of the example base shown in FIG. 6D, but in which a sensor housing is secured to the base.

The coupling surface 606 of the base 600 may be coupled to a glove having one or more electrical traces or wires that are an integral part of the glove (e.g., internal to the glove, embedded in an external surface of the glove, etc.). FIG. 6C presents a schematic diagram, in perspective view, of a digit portion of an example glove 620 that has electrical traces 622 integral to the glove 620. Each of the electrical traces 622 has a trace end 624 configured to couple to an end of one of the electrical pins 604 of the base 600. The ends of the electrical pins 604 may be adjacent the coupling surface 606 of the base 600. FIG. 6D presents a schematic diagram, in perspective view, of the example base 600 of FIG. 6A coupled to the digit portion of the example glove 620 of FIG. 6C. The base 600 is coupled to the digit portion such that the trace ends of the electrical traces 622 are aligned with respective ends of the electrical pins 604 and are in contact therewith. FIG. 6E presents a schematic diagram, in side view, of example base 600 shown in FIG. 6D, but in which a sensor housing 640 is secured to the base 600. The sensor housing 640 and a portion of the base 600 are illustrated in cross-section to expose the electrical pins 604, which extend between the trace ends of the electrical traces 622 and corresponding electrical contacts of the sensor 642 (or sensor electronic package).

In some aspects of what is described, a sensor assembly for selectively attaching and detaching a sensor to an article may be described by the following examples:

Example 1. A sensor assembly for selectively attaching and detaching a sensor to an article, the sensor assembly comprising:
  a base on the article (e.g., on an interior of the article, an exterior of the article, etc.) and configured to selectively seat and unseat a sensor housing; and
  the sensor housing, comprising:
    a cavity configured to contain the sensor, and
    an opening configured to receive the sensor into the cavity;
  wherein the base and the sensor housing comprise:
    respective pivot surfaces that, when mated, define a pivot joint configured to pivot the sensor housing relative to the base during seating and unseating, and
    respective latching surfaces configured to selectively secure and unsecure the sensor housing to the base,
    wherein the pivot and latching surfaces of the base are at opposite ends of the base and the pivot and latching surfaces of the sensor housing are at opposite ends of the sensor housing.

Example 2. The sensor assembly of example 1, wherein the base is coupled to the article.

Example 3. The sensor assembly of example 1 or example 2, wherein the base is an integral part of the article.

Example 4. The sensor assembly of example 1 or any one of examples 2-3, wherein the base comprises:
  first and second base ends defining the opposite ends of the base;
  a base length extending between the first and second base ends;
  a base side wall at the first base end and comprising the pivot surface of the base; and
  a cantilever at the second base end and comprising the latching surface of the base, the cantilever configured to flex to allow the sensor housing to seat and unseat from the base.

Example 5. The sensor assembly of example 4, wherein the sensor housing comprises:
  first and second sensor housing ends defining the opposite ends of the sensor housing;
  a sensor housing length extending between the first and second sensor housing ends;
  a first sensor housing side wall at the first sensor housing end and comprising the pivot surface of the sensor housing; and
  a second sensor housing side wall at the second sensor housing end and comprising the latching surface of the sensor housing.

Example 6. The sensor assembly of example 1 or any one of examples 2-5,
  wherein a sensor housing length extends between the opposite ends of the sensor housing and defines a lengthwise direction for the sensor housing; and
  wherein the pivot and latching surfaces are configured such that, when the sensor housing is secured to the base, the pivot and latching surfaces of the base apply opposing and balanced forces to the sensor housing along the lengthwise direction.

Example 7. The sensor assembly of example 1 or any one of examples 2-6, wherein the base comprises:
  a support surface configured to support the sensor housing when the sensor housing is seated on the base;
  a biasing element on the support surface that is configured to generate a biasing force away from the support surface when compressed; and
  wherein the pivot and latching surfaces are configured such that, when the sensor housing is secured to the base, the pivot and latching surfaces of the base apply respective forces to the sensor housing that oppose and balance the biasing force applied to the sensor housing away from the support surface.

Example 8. The sensor assembly of example 7,
  wherein the support surface is defined by a support wall of the base, the support wall formed at least in part of elastomeric material;
  wherein the support surface comprises an elastomeric surface of the elastomeric material; and
  wherein the biasing element comprises an elastomeric protrusion defined by the elastomeric surface.

Example 9. The sensor assembly of example 7, wherein the biasing element comprises a spring.

Example 10. The sensor assembly of example 1 or any one of examples 2-9,
  wherein the pivot surface of the base comprises a convex semicylindrical surface that defines a rounded end of a base side wall, the convex semicylindrical surface extending along a first longitudinal axis; and
  wherein the pivot surface of the sensor housing comprises a concave semicylindrical surface that defines a channel in a sensor housing side wall, the convex semicylindrical surface extending along a second longitudinal axis; and
  wherein the channel is configured to mate with the rounded end such that the first and second longitudinal axes become coincident.

Example 11. The sensor assembly of example 1 or any one of examples 2-9,
  wherein the pivot surface of the base comprises a pair of convex hemispherical surfaces defining respective bumps on opposite sides of a base side wall, the bumps comprising respective center axes disposed along a first longitudinal axis and aligned therewith; and
  wherein the pivot surface of the sensor housing comprises a pair of concave hemispherical surfaces defining respective dimples on opposing interior sides of the sensor housing, the dimples comprising respective center axes disposed along a second longitudinal axis and aligned therewith; and
  wherein the bumps are configured to mate with the dimples such that the first and second longitudinal axes become coincident.

Example 12. The sensor assembly of example 1 or any one of examples 2-11,
  wherein the latching surface of the base comprises a pair of angled cantilever surfaces that define a first ridge on a cantilever of the base, the pair of angled cantilever surfaces disposed on opposite sides of the first ridge; and
  wherein the latching surface of the sensor housing comprises a pair of angled sensor housing surfaces that define a second ridge on a sensor housing side wall, the pair of angled sensor housing surfaces disposed on opposite sides of the second ridge.

Example 13. The sensor assembly of example 1 or any one of examples 2-12,
  wherein the base comprises:
    first and second base ends and a base length extending therebetween, the first and second base ends defining the opposite ends of the base,
    third and fourth base ends and a base width extending therebetween, the base width perpendicular to the base length, and
    a base mechanical interface configured to mate with a sensor housing mechanical interface of the sensor housing such that, when the sensor housing is seated on the base, the base and sensor housing mechanical interfaces fix a position of the sensor housing along the base width; and wherein the sensor housing comprises the sensor housing mechanical interface.

Example 14. The sensor assembly of example 13,
wherein the base mechanical interface comprises:
a base side wall at the first or second base ends, the base side wall extending between the third and fourth base ends and parallel to a direction defined by the base width, and
a recess in the base side wall, the recess facing an interior of the base and oriented parallel to a direction defined by the base length; and
wherein sensor housing mechanical interface comprises a protrusion from a sensor housing side wall of the sensor housing configured to mate with the recess in the base side wall when the pivot surfaces of the base and sensor housing are mated.

Example 15. The sensor assembly of example 13 or example 14,
wherein the base mechanical interface comprises a base side wall disposed at the third or fourth base ends and extending between the first and second base ends, the base side wall running parallel to a direction defined by the base length and comprising an exterior surface facing an interior of the base; and
wherein the sensor housing mechanical interface comprises a sensor housing side wall extending between the opposite ends of the sensor housing, the sensor housing side wall having an exterior surface configured to mate against the exterior surface of the base side wall when the pivot surfaces of the base and sensor housing are mated.

Example 16. The sensor assembly of example 13 or any one of examples 14-15,
wherein the base comprises a support wall extending between the first and second base ends, the support wall having a support surface configured to support the sensor housing when the sensor housing is seated on the base;
wherein the base mechanical interface comprises a protrusion on the support wall extending from the support surface; and
wherein the sensor housing mechanical interface comprises a recess in a bottom side wall of the sensor housing configured to mate with the protrusion when the sensor housing is disposed against the support wall.

Example 17. The sensor assembly of example 1 or any one of examples 2-16, comprising the sensor, the sensor disposed in the cavity of the sensor housing.

Example 18. The sensor assembly of example 1 or any one of examples 2-17, wherein the article is a medical device or surgical instrument.

Example 19. The sensor assembly of example 18, wherein the article is a syringe or a stethoscope.

Example 20. The sensor assembly of example 1 or any one of examples 2-17, wherein the article is configured to be worn by a person.

Example 21. The sensor assembly of example 20, wherein the article is a shirt, a pair of pants, a shoe, a watch, or a bracelet.

Example 22. The sensor assembly of example 20,
wherein the article is a glove (e.g., a sensor glove) comprising a glove shell; and
wherein the base is on the glove shell.

Example 23. The sensor assembly of example 22, comprising:
the sensor, disposed in the cavity of the sensor housing; and
an electrical wire exterior to the glove shell and having a wire end disposed through the opening of the sensor housing, the wire end coupled to the sensor.

Example 24. The sensor assembly of example 22,
wherein the base comprises a support wall and an electrical pin, wherein:
the support wall extends between the opposite ends of the base and comprises a support surface configured to support the sensor housing when the sensor housing is seated on the base, and
the electrical pin extends through the support wall and past the support surface to terminate in an end; and
wherein sensor housing comprises a hole aligned with an electrical contact of the sensor when the sensor is disposed in the sensor housing, the hole configured to allow the end of the electrical pin to engage the electrical contact of the sensor when the sensor housing is seated on the base.

Example 25. The sensor assembly of example 24,
wherein the support wall comprises an external surface opposite the support surface;
wherein the electrical pin comprises a second end adjacent the external surface; and
wherein the glove shell comprises an electrical trace that is an integral part of the glove shell, the electrical trace comprising a trace end coupled to the second end of the electrical pin.

Example 26. The sensor assembly of example 22 or any one of examples 23-25, wherein the glove shell comprises a dorsal side and a volar side; and wherein the base is on the dorsal side of the glove shell.

Example 27. The sensor assembly of example 22 or any one of examples 23-25,
wherein the glove shell comprises:
a dorsal side and a volar side, and
a digit portion configured to fit conformally over a digit of a hand;
wherein the base is on the digit portion of the glove shell on the dorsal side, the base adjacent a distal phalange of the digit; and
wherein the base comprises first and second base ends and a base length extending therebetween, the base length no greater than a length of the distal phalange and aligned therewith.

Example 28. The sensor assembly of example 27, wherein the pivot surface of the base is located closest to a distal end of the digit and the latching surface of the base is located closest to a proximal end of the digit.

Example 29. The sensor assembly of example 27 or example 28,
wherein the glove shell comprises a digit portion for each digit of the hand; and
wherein the sensor assembly comprises a base and corresponding sensor housing for each of the digit portions.

Example 30. The sensor assembly of example 22 or any one of examples 23-29,
wherein the glove shell comprises:
a dorsal side and a volar side, and
a wrist portion configured to cover a wrist of the hand; and wherein the sensor assembly comprises:
a second base on the wrist portion of the glove shell on the dorsal side, the second base configured to selectively seat and unseat an electronics housing; and
the electronics housing, containing electronics configured to receive sensor signals from the sensor and, in response, generate data representing a property measured by the sensor.

Example 31. The sensor assembly of example 30 (and example 23), wherein the electrical wire comprises a second wire end disposed through a hole in the electronics housing, the second wire end coupled to the electronics.

Example 32. The sensor assembly of example 30 (and example 24),
wherein the second base comprises a second support wall and a second electrical pin, wherein:
the second support wall comprises a second support surface configured to support the electronics housing when the electronics housing is seated on the second base, and
the second electrical pin extends through the second support wall and past the second support surface to terminate in an end; and
wherein electronics housing comprises a hole aligned with an electrical contact of the electronics, the hole configured to allow the end of the second electrical pin to engage the electrical contact of the electronics when the electronics housing is seated on the second base.

Example 33. The sensor assembly of example 32 (and example 25),
wherein the second support wall comprises a second external surface opposite the second support surface;
wherein the second electrical pin comprises a second end adjacent the second external surface; and
wherein the electrical trace comprises a second trace end coupled to the second end of the second electrical pin.

Example 34. The sensor assembly of example 22 or any one of examples 23-33, wherein the sensor is configured to generate sensor signals in response to motion of the glove shell.

In some aspects of what is described, a method for selectively attaching and detaching a sensor to an article can be described by the following examples:

Example 35. A method for selectively attaching and detaching a sensor to an article, the method comprising:
mating a pivot surface of a sensor housing against a pivot surface of a base to define a pivot joint, the pivot joint configured to pivot the sensor housing relative to the base during seating and unseating, wherein:
the base is on the article (e.g., on an interior of the article, an exterior of the article, etc.) and configured to selectively seat and unseat the sensor housing,
the sensor housing comprises:
a cavity configured to contain the sensor, and
an opening configured to receive the sensor into the cavity,
the base and the sensor housing comprise respective latching surfaces configured to selectively secure and unsecure the sensor housing to the base, the latching surfaces of the base and sensor housing each comprising lower and upper portions,
the pivot and latching surfaces of the base are at opposite ends of the base, and
the pivot and latching surfaces of the sensor housing are at opposite ends of the sensor housing;
pivoting, by operation of the pivot joint, the sensor housing towards the base from a first pivot position to a second pivot position, thereby sliding the lower portion of the latching surface of the sensor housing against the upper portion of the latching surface of the base; and
pivoting, by operation of the pivot joint, the sensor housing towards the base from the second pivot position to a third pivot position, thereby sliding the upper portion of the latching surface of the sensor housing against the lower portion of the latching surface of the base, the sensor housing seated against the base when in the third position.

Example 36. The sensor assembly of example 35, wherein the base is coupled to the article.

Example 37. The sensor assembly of example 35 or example 36, wherein the base is an integral part of the article.

Example 38. The method of example 35 or any one of examples 36-37, comprising:
displacing the latching surface of the base away from the latching surface of the sensor housing; and
removing the sensor housing from the base by unmating the pivot surface of the sensor housing from the pivot surface of the base.

Example 39. The method of example 35 or any one of examples 36-38,
wherein a sensor housing length extends between the opposite ends of the sensor housing and defines a lengthwise direction for the sensor housing; and
wherein pivoting the sensor housing towards the base from the second pivot position to the third pivot position comprises:
contacting the pivot surface of the sensor housing to the pivot surface of the base to apply a pivot force to the sensor housing, the pivot force directed along the lengthwise direction, and
contacting the latching surface of the sensor housing to the latching surface of the base to apply a latching force to the sensor housing, the latching force opposing the pivot force along the lengthwise direction; and
wherein the latching force balances the pivot force when the sensor housing is in the third pivot position.

Example 40. The method of example 35 or any one of examples 36-39,
wherein the base comprises:
a support surface configured to support the sensor housing when the sensor housing is seated on the base;
a biasing element on the support surface and configured to generate a biasing force away from the support surface when compressed; and
wherein pivoting the sensor housing towards the base from the second pivot position to the third pivot position comprises:
applying, by operation of the biasing element, the biasing force to the sensor housing away from the support surface; and
contacting the pivot and latching surfaces of the sensor housing to, respectively, the pivot and latching surfaces of the base to apply reaction forces to the sensor housing, the reaction forces opposing and balancing the biasing force when the sensor housing is in the third pivot position.

Example 41. The method of example 35 or any one of examples 36-40,
wherein the latching surface of the base comprises a pair of angled cantilever surfaces that define a first ridge on a cantilever of the base, the pair of angled cantilever surfaces comprising lower and upper angled cantilever surfaces disposed on opposite sides of the first ridge and corresponding to the lower and upper portions of the latching surface of the base;

wherein the latching surface of the sensor housing comprises a pair of angled sensor housing surfaces that define a second ridge on a sensor housing side wall, the pair of angled sensor housing surfaces comprising upper and lower angled sensor housing surfaces disposed on opposite sides of the second ridge and corresponding to the lower and upper portions of the latching surface of the sensor housing;

wherein pivoting, by operation of the pivot joint, the sensor housing toward the base from the first pivot position to the second pivot position comprises:

displacing the cantilever from an unflexed position to a flexed position in response to the lower angled sensor housing surface sliding against the upper angled cantilever surface, the flexed position canting the cantilever away from the sensor housing; and wherein pivoting, by operation of the pivot joint, the sensor housing toward the base from the second pivot position to the third pivot position comprises:

displacing the cantilever from the flexed position to the unflexed position response to the upper angled sensor housing surface sliding against the lower angled cantilever surface.

Example 42. The method of example 35 to any one of examples 36-41, wherein the base comprises:
first and second base ends and a base length extending therebetween, the first and second base ends defining the opposite ends of the base,
third and fourth base ends and a base width extending therebetween, the base width perpendicular to the base length, and
a base mechanical interface configured to mate with a sensor housing mechanical interface of the sensor housing such that, when the sensor housing is seated on the base, the base and sensor housing mechanical interfaces fix a position of the sensor housing along the base width;

wherein the sensor housing comprises the sensor housing mechanical interface; and wherein pivoting, by operation of the pivot joint, the sensor housing towards the base from the second pivot position to the third pivot position comprises:
mating the sensor housing mechanical interface to the base mechanical interface to fix the position of the sensor housing along the base width.

Example 43. The method of example 35 or any one of examples 36-42, comprising inserting the sensor through the opening of the sensor housing into the cavity.

Example 44. The method of example 35 or any one of examples 36-43, wherein the article is a medical device or surgical instrument.

Example 45. The method of example 44, wherein the article is a syringe or a stethoscope.

Example 46. The method of example 35 or any one of examples 36-43, wherein the article is configured to be worn by a person.

Example 47. The method of example 46, wherein the article is a shirt, a pair of pants, a shoe, a watch, or a bracelet.

Example 48. The method of example 46,
wherein the article is a glove (e.g., a sensor glove) comprising a glove shell; and
wherein the base is on the glove shell.

Example 49. The method of example 48, comprising:
inserting the sensor through the opening of the sensor housing into the cavity; and
coupling a first wire end of an electrical wire to the sensor;

Example 50. The method of example 48, comprising:
inserting the sensor through the opening of the sensor housing into the cavity; and
contacting an electrical pin of the base with an electrical contact of the sensor, wherein:
the base comprises:
a support wall extending between the opposite ends of the base and comprising a support surface configured to support the sensor housing when the sensor housing is seated on the base, and
the electrical pin, extending through the support wall and past the support surface to terminate in an end; and
the sensor housing comprises a hole aligned with the electrical contact of the sensor when the sensor is disposed in the sensor housing, the hole configured to allow the end of the electrical pin to engage the electrical contact of the sensor when the sensor housing is seated on the base.

Example 51. The method of example 50, wherein contacting the electrical pin occurs when the sensor housing is pivoted from the second pivot position to the third pivot position.

Example 52. The method of example 51, wherein contacting the electrical pin further occurs when the sensor housing is pivoted from the first pivot position to the second pivot position.

Example 53. The method of example 50 or any one of examples 51-52,
wherein the support wall comprises an external surface opposite the support surface;
wherein the electrical pin comprises a second end adjacent the external surface; and
wherein the glove shell comprises an electrical trace that is an integral part of the glove shell, the electrical trace comprising a trace end coupled to the second end of the electrical pin.

Example 54. The method of example 48 or any one of examples 49-53,
wherein the glove shell comprises a dorsal side and a volar side; and
wherein the base is on the dorsal side of the glove shell.

Example 55. The method of example 48 or any one of examples 49-53,
wherein the glove shell comprises:
a dorsal side and a volar side, and
a digit portion configured to fit conformally over a digit of a hand;
wherein the base is on the digit portion of the glove shell on the dorsal side, the base adjacent a distal phalange of the digit; and
wherein the base comprises first and second base ends and a base length extending therebetween, the base length no greater than a length of the distal phalange and aligned therewith.

Example 56. The method of example 55, wherein the pivot surface of the base is located closest to a distal end of the digit and the latching surface of the base is located closest to a proximal end of the digit.

Example 57. The method of example 55 or example 56,
wherein the glove shell comprises a digit portion for each digit of the hand; and wherein the sensor assembly comprises a base and corresponding sensor housing for each of the digit portions.

Example 58. The method of example 48 or any one of examples 49-57,
wherein the glove shell comprises:
a dorsal side and a volar side, and
a wrist portion configured to cover a wrist of the hand;
wherein the sensor assembly comprises:
a second base on the wrist portion of the glove shell on the dorsal side, the second base configured to selectively seat and unseat an electronics housing, and
the electronics housing, containing electronics configured to receive sensor signals from the sensor and, in response, generate data representing a property measured by the sensor; and wherein the method comprises coupling the electronics housing to the second base.

Example 59. The method of example 58 (and example 49), comprising:
coupling a second wire end of the electrical wire to the electronics.

Example 60. The method of example 58 (and example 50), comprising:
contacting a second electrical pin of the second base with an electrical contact of the electronics, wherein:
the second base comprises a second support wall having a second support surface configured to support the electronics housing when the electronics housing is seated on the second base;
the second electrical pin extends through the second support wall and past the support surface to terminate in an end; and
the electronics housing comprises a hole aligned with the electrical contact of the electronics, the hole configured to allow the end of the second electrical pin to engage the electrical contact of the electronics when the electronics housing is seated on the second base.

Example 61. The method of example 60 (and example 53),
wherein the second support wall comprises a second external surface opposite the second support surface;
wherein the second electrical pin comprises a second end adjacent the second external surface; and
wherein the electrical trace comprises a second trace end coupled to the second end of the second electrical pin.

Example 62. The method of example 48 or any one of examples 49-61, wherein the sensor is configured to generate sensor signals in response to motion of the glove shell.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:
1. A sensor glove, comprising:
a glove shell;
a base on the glove shell and configured to selectively seat and unseat a sensor housing; and
the sensor housing, comprising:
a cavity configured to contain a sensor, and
an opening configured to receive the sensor into the cavity;
wherein the base and the sensor housing comprise:
respective pivot surfaces that, when mated, define a pivot joint configured to pivot the sensor housing relative to the base during seating and unseating, and
respective latching surfaces configured to selectively secure and unsecure the sensor housing to the base,
wherein the pivot and latching surfaces of the base are at opposite ends of the base and the pivot and latching surfaces of the sensor housing are at opposite ends of the sensor housing.

2. The sensor glove of claim 1,
wherein a sensor housing length extends between the opposite ends of the sensor housing and defines a lengthwise direction for the sensor housing; and
wherein the pivot and latching surfaces are configured such that, when the sensor housing is secured to the base, the pivot and latching surfaces of the base apply opposing and balanced forces to the sensor housing along the lengthwise direction.

3. The sensor glove of claim 1, wherein the base comprises:
a support surface configured to support the sensor housing when the sensor housing is seated on the base;
a biasing element on the support surface that is configured to generate a biasing force away from the support surface when compressed; and
wherein the pivot and latching surfaces are configured such that, when the sensor housing is secured to the base, the pivot and latching surfaces of the base apply respective forces to the sensor housing that oppose and balance the biasing force applied to the sensor housing away from the support surface.

4. The sensor glove of claim 1,
wherein the latching surface of the base comprises a pair of angled cantilever surfaces that define a first ridge on a cantilever of the base, the pair of angled cantilever surfaces disposed on opposite sides of the first ridge; and
wherein the latching surface of the sensor housing comprises a pair of angled sensor housing surfaces that define a second ridge on a sensor housing side wall, the pair of angled sensor housing surfaces disposed on opposite sides of the second ridge.

5. The sensor glove of claim 1,
wherein the base comprises:
first and second base ends and a base length extending therebetween, the first and second base ends defining the opposite ends of the base, third and fourth base ends and a base width extending therebetween, the base width perpendicular to the base length, and a base mechanical interface configured to mate with a sensor housing mechanical interface of the sensor housing such that, when the sensor housing is seated on the base, the base and sensor housing mechanical interfaces fix a position of the sensor housing along the base width; and wherein the sensor housing comprises the sensor housing mechanical interface.

6. The sensor glove of claim 1, wherein the glove shell comprises a dorsal side and a volar side; and wherein the base is on the dorsal side of the glove shell.

7. The sensor glove of claim 1, wherein the glove shell comprises:
 a dorsal side and a volar side, and
 a digit portion configured to fit conformally over a digit of a hand;

wherein the base is on the digit portion of the glove shell on the dorsal side, the base adjacent a distal phalange of the digit; and wherein the base comprises first and second base ends and a base length extending therebetween, the base length no greater than a length of the distal phalange and aligned therewith.

8. The sensor glove of claim 1, wherein the glove shell comprises:

an interior surface that defines an interior of the glove shell, the interior shaped to receive a human hand; and an exterior surface that defines an exterior of the glove shell, the exterior taking on the shape of the human hand when the human hand resides in the interior of the glove shell, the base disposed on the exterior surface of the glove shell.

9. The sensor glove of claim 1, wherein the base comprises:

first and second base ends defining the opposite ends of the base;

a base length extending between the first and second base ends;

a base side wall at the first base end and comprising the pivot surface of the base; and a cantilever at the second base end and comprising the latching surface of the base, the cantilever configured to flex to allow the sensor housing to seat and unseat from the base.

10. The sensor glove of claim 9, wherein the sensor housing comprises:

first and second sensor housing ends defining the opposite ends of the sensor housing;

a sensor housing length extending between the first and second sensor housing ends;

a first sensor housing side wall at the first sensor housing end and comprising the pivot surface of the sensor housing; and a second sensor housing side wall at the second sensor housing end and comprising the latching surface of the sensor housing.

11. The sensor glove of claim 1, wherein the base comprises a support wall and an electrical pin, wherein:
 the support wall extends between the opposite ends of the base and comprises a support surface configured to support the sensor housing when the sensor housing is seated on the base, and
 the electrical pin extends through the support wall and past the support surface to terminate in an end; and wherein sensor housing comprises a hole aligned with an electrical contact of the sensor when the sensor is disposed in the sensor housing, the hole configured to allow the end of the electrical pin to engage the electrical contact of the sensor when the sensor housing is seated on the base.

12. The sensor glove of claim 11, wherein the support wall comprises an external surface opposite the support surface;

wherein the electrical pin comprises a second end adjacent the external surface; and wherein the glove shell comprises an electrical trace that is an integral part of the glove shell, the electrical trace comprising a trace end coupled to the second end of the electrical pin.

13. A method comprising:

receiving a glove shell that comprises a base configured to selectively seat and unseat a sensor housing, wherein:
 the base is on the glove shell;
 the sensor housing comprises:
  a cavity configured to contain a sensor, and
  an opening configured to receive the sensor into the cavity, and
 the base and the sensor housing comprise:
  respective pivot surfaces that, when mated, define a pivot joint configured to pivot the sensor housing relative to the base during seating and unseating, and
  respective latching surfaces configured to selectively secure and unsecure the sensor housing to the base,
  wherein the pivot and latching surfaces of the base are at opposite ends of the base and the pivot and latching surfaces of the sensor housing are at opposite ends of the sensor housing;

mating a pivot surface of the sensor housing against a pivot surface of the base to define the pivot joint;

pivoting, by operation of the pivot joint, the sensor housing towards the base from a first pivot position to a second pivot position, thereby sliding the lower portion of the latching surface of the sensor housing against the upper portion of the latching surface of the base; and pivoting, by operation of the pivot joint, the sensor housing towards the base from the second pivot position to a third pivot position, thereby sliding the upper portion of the latching surface of the sensor housing against the lower portion of the latching surface of the base, the sensor housing seated against the base when in the third position.

14. The method of claim 13, comprising:

displacing the latching surface of the base away from the latching surface of the sensor housing; and removing the sensor housing from the base by unmating the pivot surface of the sensor housing from the pivot surface of the base.

15. The method of claim 13, wherein a sensor housing length extends between the opposite ends of the sensor housing and defines a lengthwise direction for the sensor housing; and wherein pivoting the sensor housing towards the base from the second pivot position to the third pivot position comprises:

contacting the pivot surface of the sensor housing to the pivot surface of the base to apply a pivot force to the sensor housing, the pivot force directed along the lengthwise direction, and contacting the latching surface of the sensor housing to the latching surface of the base to apply a latching force to the sensor housing, the latching force opposing the pivot force along the lengthwise direction; and wherein the latching force balances the pivot force when the sensor housing is in the third pivot position.

16. The method of claim 13, wherein the base comprises:
a support surface configured to support the sensor housing when the sensor housing is seated on the base;
a biasing element on the support surface and configured to generate a biasing force away from the support surface when compressed; and wherein pivoting the sensor housing towards the base from the second pivot position to the third pivot position comprises:
applying, by operation of the biasing element, the biasing force to the sensor housing away from the support surface; and
contacting the pivot and latching surfaces of the sensor housing to, respectively, the pivot and latching surfaces of the base to apply reaction forces to the sensor housing, the reaction forces opposing and balancing the biasing force when the sensor housing is in the third pivot position.

17. The method of claim 13, wherein the latching surface of the base comprises a pair of angled cantilever surfaces that define a first ridge on a cantilever of the base, the pair of angled cantilever surfaces comprising lower and upper angled cantilever surfaces disposed on opposite sides of the first ridge and corresponding to the lower and upper portions of the latching surface of the base;

wherein the latching surface of the sensor housing comprises a pair of angled sensor housing surfaces that define a second ridge on a sensor housing side wall, the pair of angled sensor housing surfaces comprising upper and lower angled sensor housing surfaces disposed on opposite sides of the second ridge and corresponding to the lower and upper portions of the latching surface of the sensor housing;

wherein pivoting, by operation of the pivot joint, the sensor housing toward the base from the first pivot position to the second pivot position comprises:
displacing the cantilever from an unflexed position to a flexed position in response to the lower angled sensor housing surface sliding against the upper angled cantilever surface, the flexed position canting the cantilever away from the sensor housing; and wherein pivoting, by operation of the pivot joint, the sensor housing toward the base from the second pivot position to the third pivot position comprises:
displacing the cantilever from the flexed position to the unflexed position response to the upper angled sensor housing surface sliding against the lower angled cantilever surface.

18. The method of claim 13, wherein the base comprises:
first and second base ends and a base length extending therebetween, the first and second base ends defining the opposite ends of the base,
third and fourth base ends and a base width extending therebetween, the base width perpendicular to the base length, and
a base mechanical interface configured to mate with a sensor housing mechanical interface of the sensor housing such that, when the sensor housing is seated on the base, the base and sensor housing mechanical interfaces fix a position of the sensor housing along the base width;

wherein the sensor housing comprises the sensor housing mechanical interface; and wherein pivoting, by operation of the pivot joint, the sensor housing towards the base from the second pivot position to the third pivot position comprises:
mating the sensor housing mechanical interface to the base mechanical interface to fix the position of the sensor housing along the base width.

19. The method of claim 13, wherein the glove shell comprises a dorsal side and a volar side; and wherein the base is on the dorsal side of the glove shell.

20. The method of claim 13, wherein the glove shell comprises:
a dorsal side and a volar side, and
a digit portion configured to fit conformally over a digit of a hand;

wherein the base is on the digit portion of the glove shell on the dorsal side, the base adjacent a distal phalange of the digit; and wherein the base comprises first and second base ends and a base length extending therebetween, the base length no greater than a length of the distal phalange and aligned therewith.

21. The method of claim 13, wherein the glove shell comprises:
an interior surface that defines an interior of the glove shell, the interior shaped to receive a human hand; and
an exterior surface that defines an exterior of the glove shell, the exterior taking on the shape of the human hand when the human hand resides in the interior of the glove shell, the base disposed on the exterior surface of the glove shell.

22. The method of claim 13, comprising:
inserting the sensor through the opening of the sensor housing into the cavity; and
contacting an electrical pin of the base with an electrical contact of the sensor, wherein:
the base comprises:
a support wall extending between the opposite ends of the base and comprising a support surface configured to support the sensor housing when the sensor housing is seated on the base, and
the electrical pin, extending through the support wall and past the support surface to terminate in an end; and
the sensor housing comprises a hole aligned with the electrical contact of the sensor when the sensor is disposed in the sensor housing, the hole configured to allow the end of the electrical pin to engage the electrical contact of the sensor when the sensor housing is seated on the base.

23. The method of claim 22, wherein contacting the electrical pin occurs when the sensor housing is pivoted at least from the second pivot position to the third pivot position.

24. The method of claim 22,
wherein the support wall comprises an external surface opposite the support surface;
wherein the electrical pin comprises a second end adjacent the external surface; and
wherein the glove shell comprises an electrical trace that is an integral part of the glove shell, the electrical trace comprising a trace end coupled to the second end of the electrical pin.

* * * * *

UNITED STATES PATENT AND TRADEMARK OFFICE
CERTIFICATE OF CORRECTION

PATENT NO. : 12,374,826 B1
APPLICATION NO. : 17/737540
DATED : July 29, 2025
INVENTOR(S) : Kirby et al.

Page 1 of 1

It is certified that error appears in the above-identified patent and that said Letters Patent is hereby corrected as shown below:

In the Specification

Column 3, Detailed Description, Line 38 Delete "102" and insert -- 120 -- therefor Column 6, Detailed Description, Line 43 Delete "200" and insert -- 202 -- therefor Column 7, Detailed Description, Line 21 Delete "208." and insert -- 242. -- therefor Column 7, Detailed Description, Line 44 Delete "258" and insert -- 252 -- therefor Column 7, Detailed Description, Line 50 Delete "258" and insert -- 252 -- therefor Column 7, Detailed Description, Line 53 Delete "250." and insert -- 220. -- therefor Column 8, Detailed Description, Line 24 Delete "200" and insert -- 202 -- therefor Column 12, Detailed Description, Line 8 Delete "504" and insert -- 506 -- therefor Column 16, Detailed Description, Line 35 After "23-25," insert -- ¶ --

Column 16, Detailed Description, Line 36 After "and" insert -- ¶ --

Column 21, Detailed Description, Line 16 After "and" insert -- ¶ --

Signed and Sealed this
Twenty-first Day of October, 2025

John A. Squires
*Director of the United States Patent and Trademark Office*